United States Patent
Nigo

(10) Patent No.: US 11,804,739 B2
(45) Date of Patent: Oct. 31, 2023

(54) MOTOR HAVING STATOR AND ROTOR CONFIGURED TO REDUCE EDDY CURRENT LOSS, AND COMPRESSOR AND AIR CONDITIONER INCORPORATING SAME

(71) Applicant: Mitsubishi Electric Corporation, Tokyo (JP)

(72) Inventor: Masahiro Nigo, Chiyoda-ku (JP)

(73) Assignee: Mitsubishi Electric Corporation, Tokyo (JP)

( * ) Notice: Subject to any disclaimer, the term of this patent is extended or adjusted under 35 U.S.C. 154(b) by 466 days.

(21) Appl. No.: 17/251,048

(22) PCT Filed: Jul. 27, 2018

(86) PCT No.: PCT/JP2018/028170
§ 371 (c)(1),
(2) Date: Dec. 10, 2020

(87) PCT Pub. No.: WO2020/021692
PCT Pub. Date: Jan. 30, 2020

(65) Prior Publication Data
US 2021/0203196 A1 Jul. 1, 2021

(51) Int. Cl.
*H02K 1/16* (2006.01)
*F25B 31/02* (2006.01)
(Continued)

(52) U.S. Cl.
CPC ............. *H02K 1/16* (2013.01); *F25B 31/026* (2013.01); *H02K 1/276* (2013.01); *H02K 3/42* (2013.01)

(58) Field of Classification Search
CPC ........ H02K 1/16; H02K 1/276; H02K 1/2766; H02K 1/148; H02K 1/185; H02K 3/345;
(Continued)

(56) References Cited

U.S. PATENT DOCUMENTS

| | | | |
|---|---|---|---|
| 10,483,816 B2 | 11/2019 | Nigo et al. | |
| 11,394,258 B2 * | 7/2022 | Yabe | F24F 1/00073 |
| 2009/0267428 A1 | 10/2009 | Nakahara et al. | |

FOREIGN PATENT DOCUMENTS

| | | |
|---|---|---|
| EP | 1496596 A1 | 1/2005 |
| JP | 2009284756 A | 12/2009 |

(Continued)

OTHER PUBLICATIONS

Office Action dated Sep. 22, 2021 in connection with counterpart IN Patent Application No. 202027055620.
(Continued)

*Primary Examiner* — Emily P Pham
(74) *Attorney, Agent, or Firm* — POSZ LAW GROUP, PLC

(57) ABSTRACT

A rotor core has steel laminations stacked in the axial direction, and a permanent magnet is embedded in the rotor core. A stator core has steel laminations stacked in the axial direction, and a coil is wound on the stator core. The stator core has a slot for housing the coil. The stator core has a first core portion at an end portion in the axial direction and a second core portion at a center portion in the axial direction. An area of the slot is larger in the first core portion than in the second core portion. A sheet thickness T0 and a lamination gap L0 of the steel laminations of the rotor core and a sheet thickness T1 and a lamination gap L1 of the steel laminations of the first core portion of the stator core satisfy at least one of 0.05 mm≤T0−T1≤0.15 mm and L0<L1.

13 Claims, 18 Drawing Sheets

(51) Int. Cl.
  *H02K 1/276* (2022.01)
  *H02K 3/42* (2006.01)
(58) Field of Classification Search
  CPC .... H02K 3/522; H02K 21/16; H02K 2201/09; H02K 2203/12; H02K 2213/03; F25B 31/026
  See application file for complete search history.

(56) References Cited

FOREIGN PATENT DOCUMENTS

| JP | 2010-045870 A | 2/2010 |
|---|---|---|
| JP | 2015171249 A | 9/2015 |
| JP | 2017017784 A | 1/2017 |
| JP | 2017099044 A | 6/2017 |
| JP | 2017103850 A | 6/2017 |
| WO | 2017072967 A1 | 5/2017 |
| WO | 2018/016026 A1 | 1/2018 |

OTHER PUBLICATIONS

International Search Report of the International Searching Authority dated Oct. 23, 2018 for the corresponding International application No. PCT/JP2018/028170 (and English translation).

Office Action dated Oct. 24, 2022 in corresponding KR Patent Application No. 10-2021-7001779 (with English translation).

Office Action dated Jul. 6, 2021 in corresponding JP Application No. 2020-532101 ( and English translation).

Extended European Search Report dated Jul. 23, 2021 corresponding to EP Application No. 18927889.8.

Office Action dated Aug. 16, 2023, issued for the corresponding CN patent application No. 201880095616.8 (and English Translation).

\* cited by examiner

MOTOR HAVING STATOR AND ROTOR CONFIGURED TO REDUCE EDDY CURRENT LOSS, AND COMPRESSOR AND AIR CONDITIONER INCORPORATING SAME

CROSS REFERENCE TO RELATED APPLICATION

This application is a U.S. national stage application of International Application No. PCT/JP2018/028170 filed on Jul. 27, 2018, the contents of which are incorporated herein by reference.

TECHNICAL FIELD

The present invention relates to a motor, a compressor, and an air conditioner.

BACKGROUND ART

A stator of a motor includes a stator core having a plurality of teeth around which a coil is wound. A slot that houses the coil therein is formed between adjacent teeth of the stator core. Recently, in order to increase an area of the slot, a configuration in which a width of the tooth is narrowed at an end portion of the stator core in the axial direction is proposed (see, for example, Patent References 1 to 4).

PATENT REFERENCE

[Patent Reference 1] Japanese Patent Application Publication No. 2017-103850 (see FIG. 1)
[Patent Reference 2] Japanese Patent Application Publication No. 2015-171249 (see FIG. 3)
[Patent Reference 3] Japanese Patent Application Publication No. 2017-99044 (see FIG. 5)
[Patent Reference 4] Japanese Patent Application Publication No. 2017-17784 (see FIG. 2)

A magnetic flux from the rotor flows into the tooth, and a magnetic flux density tends to be high in the tooth having a narrow width. When the magnetic flux density is saturated in the tooth having the narrow width, part of the magnetic flux flows in the axial direction in the stator core. Consequently, the magnetic flux flows in a direction perpendicular to sheet surfaces of steel laminations constituting the stator core. Thus, eddy current is generated, and causes reduction in the motor efficiency due to eddy current loss (iron loss).

SUMMARY

The present invention is intended to solve the above-described problems, and an object of the present invention is to reduce eddy current loss in a motor.

A motor of the present invention includes a rotor rotatable about a rotation axis, and a stator provided so as to surround the rotor. The rotor has a rotor core having steel laminations stacked in an axial direction of the rotation axis and a permanent magnet embedded in the rotor core. The stator has a stator core having steel laminations stacked in the axial direction and a coil wound on the stator core. The stator core has a slot in which the coil is housed. The stator core has a first core portion at an end portion of the stator core in the axial direction and a second core portion at a center portion of the stator core in the axial direction. An area of the slot is larger in the first core portion than in the second core portion. A sheet thickness $T0$ and a lamination gap $L0$ of the steel laminations of the rotor core and a sheet thickness $T1$ and a lamination gap $L1$ of the steel laminations of the first core portion of the stator core satisfy at least one of $0.05 \text{ mm} \leq T0-T1 \leq 0.15 \text{ mm}$ and $L0<L1$.

According to the present invention, at least one of $T0>T1$ and $L0<L1$ is satisfied, and thus the magnetic flux flowing in the axial direction in the stator core is reduced. This suppresses generation of eddy current, and thus the eddy current loss (iron loss) can be reduced and the motor efficiency can be enhanced.

DESCRIPTION

First Embodiment (Configuration of Motor)

Figure 1:
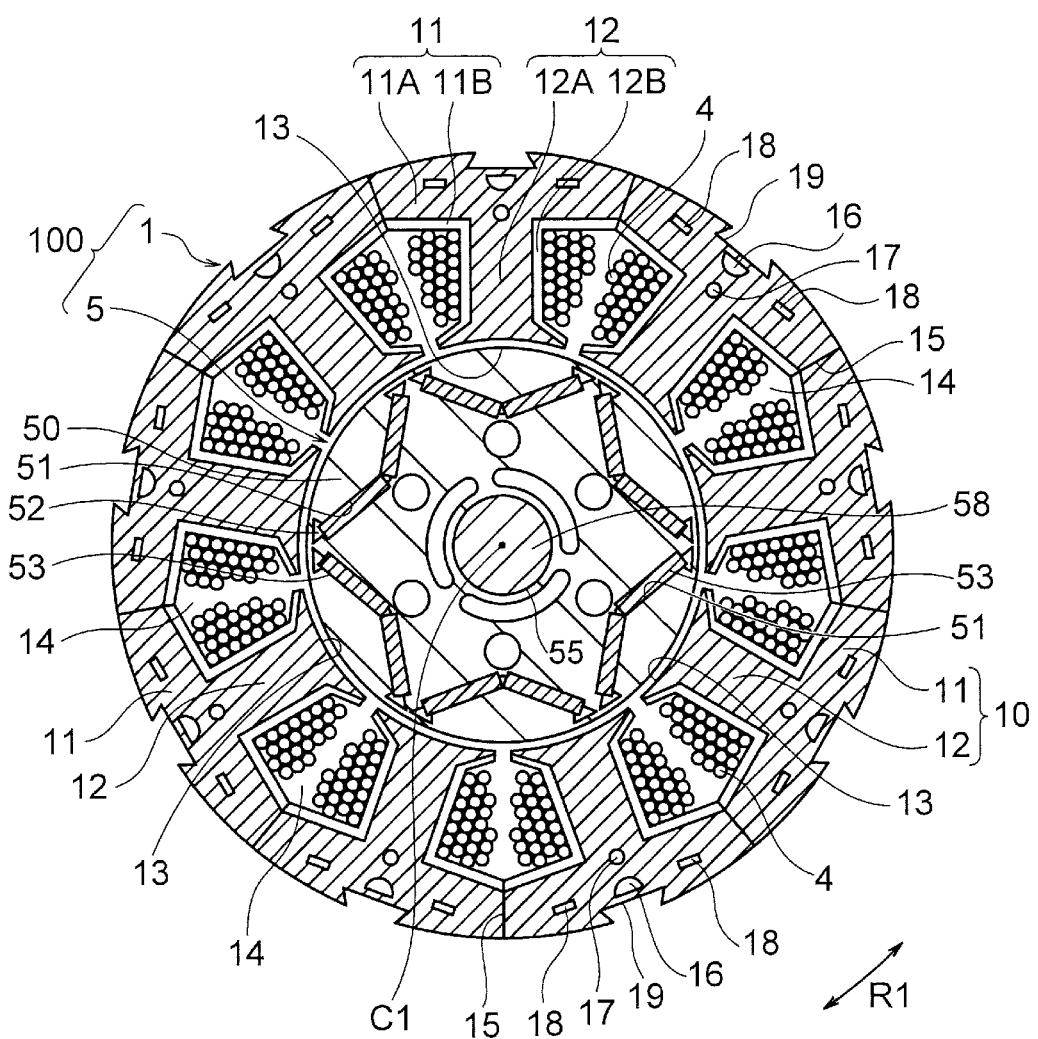
FIG. 1 is a cross-sectional view showing a motor of a first embodiment.
Figure 20:
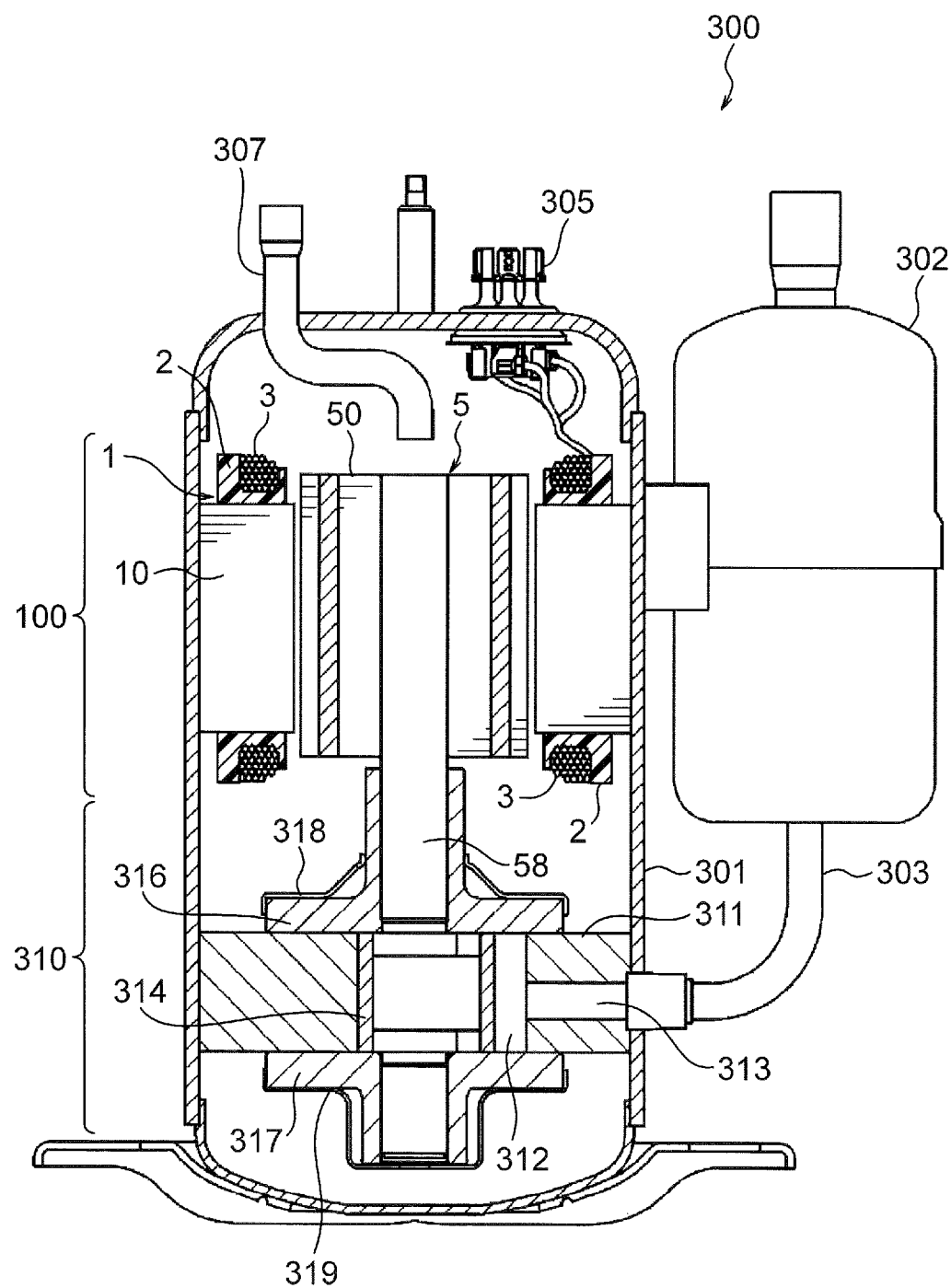
FIG. 20 is a cross-sectional view showing a rotary compressor to which the motor of each embodiment is applicable.

A motor 100 of a first embodiment of the present invention will be described. FIG. 1 is a cross-sectional view showing the motor 100 of the first embodiment of the present invention. The motor 100 is a permanent magnet embedded motor in which permanent magnets 53 are embedded in a rotor 5. The motor 100 is used in, for example, a rotary compressor 300 (FIG. 20).

The motor 100 is a motor called an inner-rotor type, and includes a stator 1 and the rotor 5 rotatably provided on an inner side of the stator 1. An air gap of, for example, 0.3 to 1.0 mm is formed between the stator 1 and the rotor 5.

Hereinafter, a direction of a center axis C1 which is a rotation axis of the rotor 5 is simply referred to as an "axial direction". A circumferential direction about the center axis C1 (indicated by an arrow R1 in FIG. 1) is simply referred to as a "circumferential direction". A radial direction about the center axis C1 is simply referred to as a "radial direction". FIG. 1 is a cross-sectional view on a plane perpendicular to the center axis C1.

(Configuration of Rotor)

The rotor 5 has a cylindrical rotor core 50, permanent magnets 53 embedded in the rotor core 50, and a shaft 58 fixed to a center portion of the rotor core 50. The shaft 58 is, for example, a shaft of the compressor 300 (FIG. 20).

The rotor core 50 is composed of steel laminations 501 (FIG. 8) which are stacked in the axial direction and integrated together by crimping or the like. Each of the steel laminations 501 is, for example, an electromagnetic steel sheet. A sheet thickness of each of the steel laminations 501 and a lamination gap between the steel laminations 501 will be described later.

A plurality of magnet insertion holes 51 into which the permanent magnets 53 are inserted are formed along an outer circumferential surface of the rotor core 50. Each magnet insertion hole 51 is a through hole passing through the rotor core 50 in the axial direction. The number of magnet insertion holes 51 is six in this example. However, the number of magnet insertion holes 51 is not limited to six, and it is sufficient that the number of magnet insertion holes 51 is two or more. Each magnet insertion hole 51 corresponds to one magnetic pole. A region between adjacent magnet insertion holes 51 corresponds to an inter-polar portion.

The magnet insertion hole 51 is formed in a V shape such that a center portion of the magnet insertion hole 51 in the circumferential direction protrudes most toward the center axis C1. In each magnet insertion hole 51, two permanent magnets 53 are disposed on both sides of the center portion of the magnet insertion hole 51 in the circumferential direction. The two permanent magnets 53 in the magnet insertion hole 51 are magnetized so that pole-faces of the same polarity face the outer side in the radial direction.

Each permanent magnet 53 is a flat-plate member elongated in the axial direction and has a width in the circumferential direction of the rotor core 50 and a thickness in the radial direction of the rotor core 50. The thickness of the permanent magnet 53 is, for example, 2 mm. The permanent magnet 53 is formed of a rare earth magnet that contains, for example, neodymium (Nd), iron (Fe) and boron (B) as main components. The permanent magnet 53 is magnetized in the thickness direction.

Although two permanent magnets 53 are disposed in each magnet insertion hole 51 in this example, it is also possible to dispose one permanent magnet 53 in each magnet insertion hole 51. In this case, the magnet insertion hole 51 is not formed in the V shape as described above, but is formed linearly.

A flux barrier (a leakage flux suppression hole) 52 is formed on each of both ends of the magnet insertion hole 51 in the circumferential direction. The flux barrier 52 is provided for suppressing leakage magnetic flux between adjacent magnetic poles. A core portion between the flux barrier 52 and the outer circumference of the rotor core 50 is a thin-walled portion for suppressing short circuit of the magnetic flux between the adjacent magnetic poles. A thickness of the thin-walled portion is desirably the same as the thickness of each of the steel laminations 501 of the rotor core 50.

(Configuration of Stator)

The stator 1 includes a stator core 10 and a coil 4 wound on the stator core 10. The stator core 10 has a yoke 11 having an annular shape about the center axis C1 and a plurality of teeth 12 extending inward in the radial direction (i.e., in a direction toward the center axis C1) from the yoke 11. A tooth end portion 13 facing the outer circumferential surface of the rotor 5 is formed at an inner end portion of the tooth 12 in the radial direction.

In this example, nine teeth 12 are arranged at equal intervals in the circumferential direction, but it is sufficient that the number of teeth 12 is three or more. A slot 14, which is a space for housing the coil 4, is formed between the teeth 12 adjacent to each other in the circumferential direction.

The stator core 10 has a configuration in which a plurality (nine in this example) of split cores 9, each including one tooth 12, are connected together in an annular shape. These split cores 9 are connected to each other at split surface portions 15 each of which is formed in the yoke 11 at a midpoint between the two adjacent teeth 12. More specifically, the adjacent split cores 9 are connected to each other by joint wraps or plastically deformable thin-walled portions (not shown) provided on the outer circumferential side of the split surface portions 15.

Figure 6A:
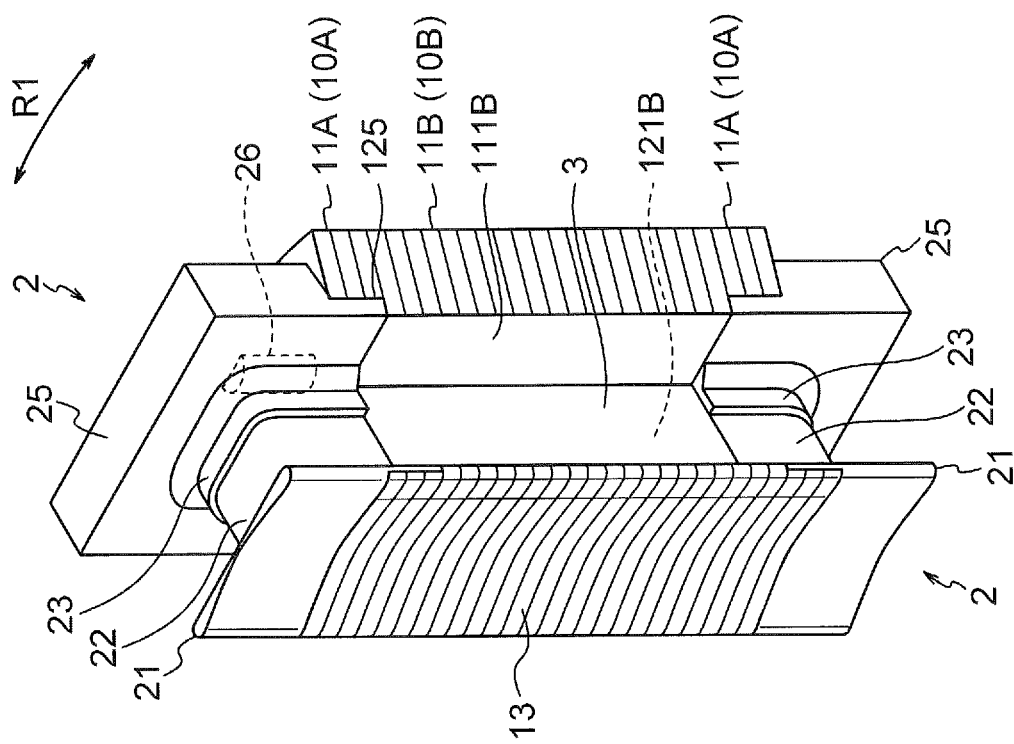
FIG. 6(A) is a perspective view showing a part of a stator core of the first embodiment.
Figure 6B:
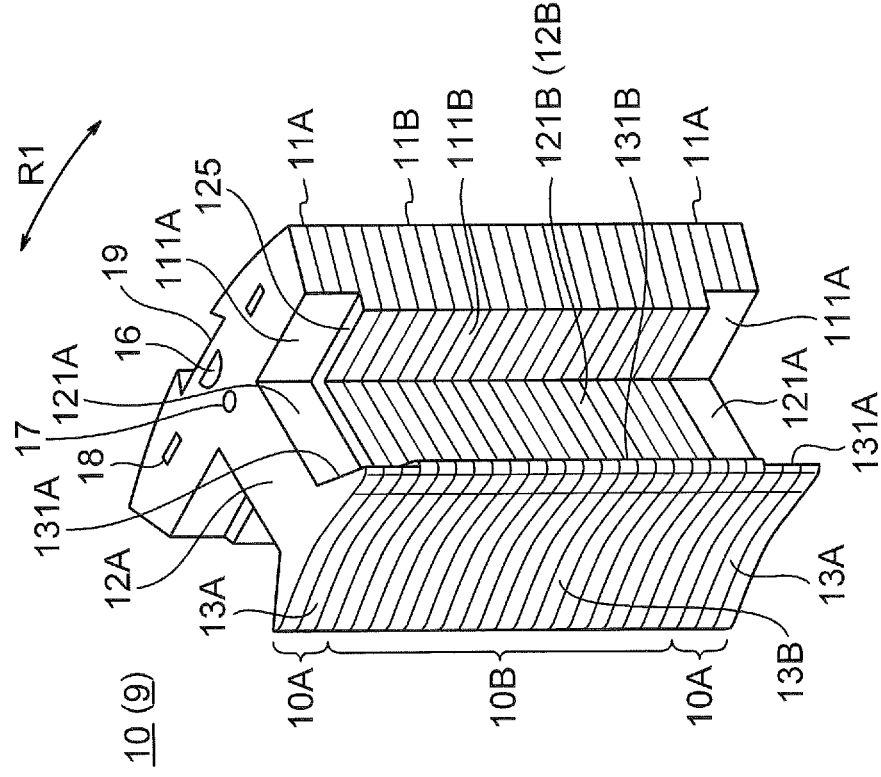
FIG. 6(B) is a perspective view showing a state where insulators and insulating films are attached to the stator core.

The coil 4 is obtained by winding a magnet wire around the teeth 12 via insulators 2 and insulating films 3 (FIG. 6(B)). A wire diameter of the coil 4 is, for example, 1.0 mm. The coil 4 is wound around each tooth 12, for example, 80 turns in a concentrated winding manner. The coil 4 has coil portions of three phases which are connected in Y connection. The wire diameter and the number of turns of the coil 4 are determined according to a required number of rotations, a required torque, an applied voltage, or an area of the slot 14. In a process in which the coil 4 is wound on the stator core 10, the split cores 9 of the stator core 10 are unfolded into a strip shape, and thus a winding operation of the coil 4 is facilitated.

Figure 8:
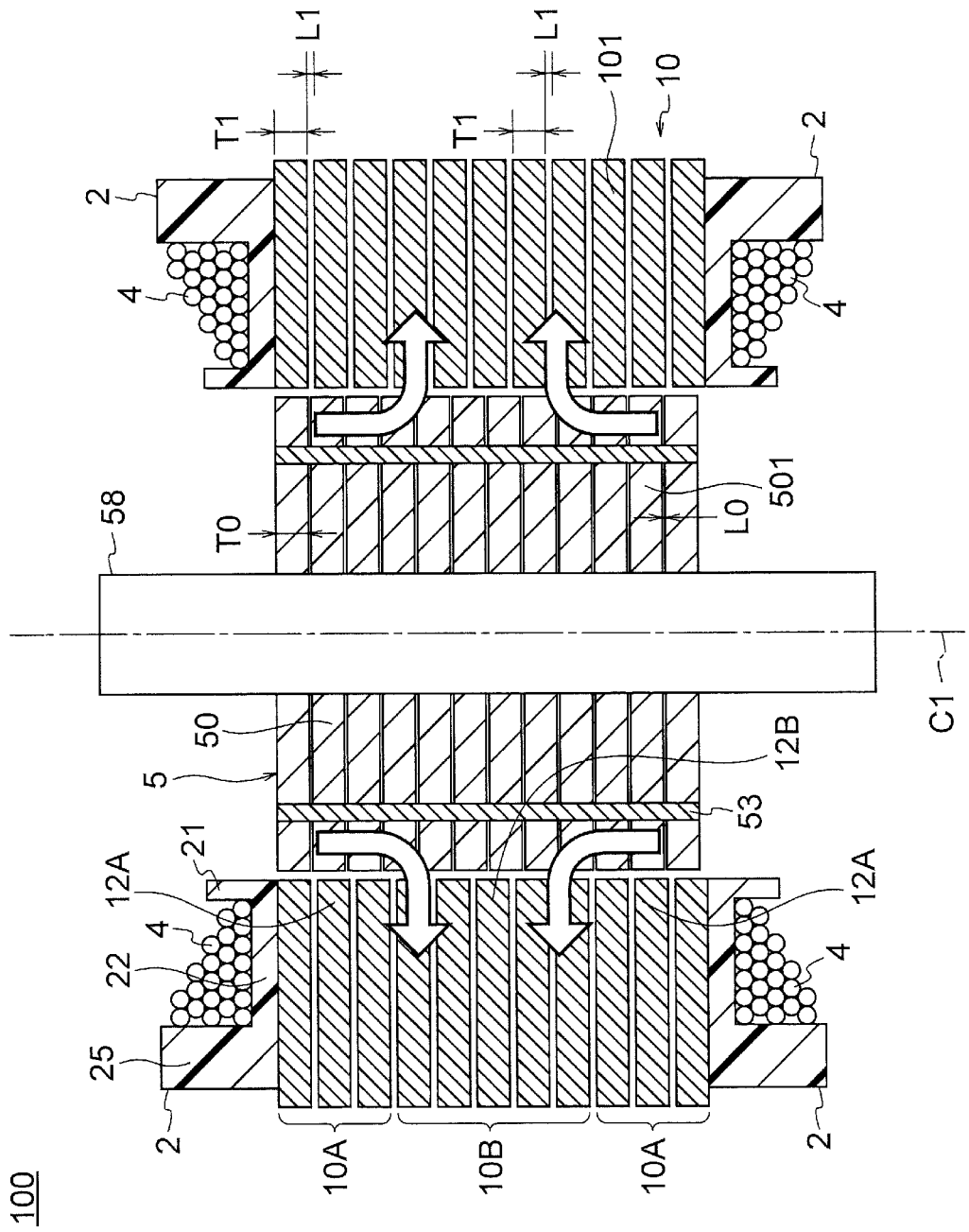
FIG. 8 is a longitudinal-sectional view showing the motor of the first embodiment.

As shown in FIG. 8 described later, the stator core 10 has a first core portion 10A at each of both end portions of the stator core 10 in the axial direction and a second core portion 10B at a center portion of the stator core 10 in the axial direction. In this regard, the first core portion 10A is not necessarily provided at each of both end portions of the stator core 10 in the axial direction, but it is sufficient that the first core portion 10A is provided at least at one end portion of the stator core 10 in the axial direction.

Figure 2:
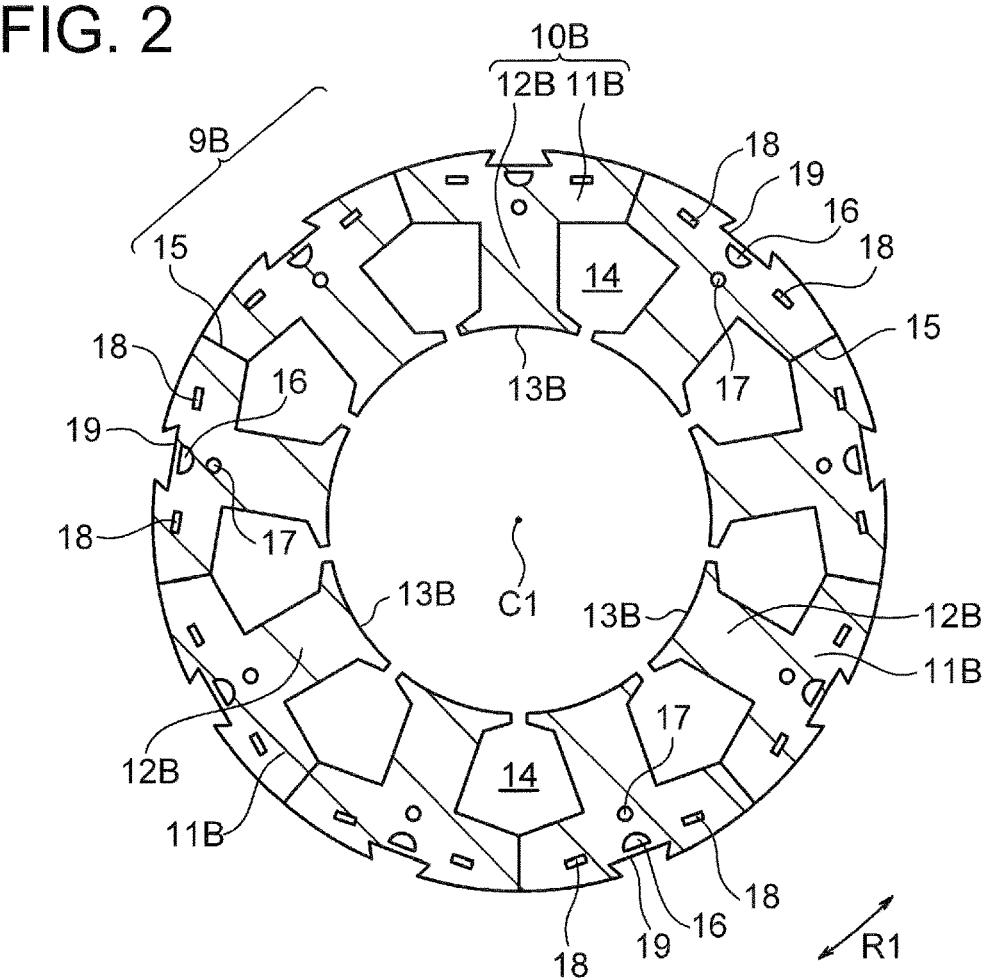
FIG. 2 is a cross-sectional view showing a second core portion of the first embodiment.

FIG. 2 is a plan view showing the second core portion 10B. The second core portion 10B is composed of steel laminations 101 (FIG. 8) which are stacked in the axial direction and integrated together by crimping or the like.

Each of the steel laminations 101 is, for example, an electromagnetic steel sheet. A sheet thickness of each of the steel laminations 101 and a lamination gap between the steel laminations 101 will be described later.

The second core portion 10B has an annular second yoke portion 11B and a plurality of second tooth portions 12B extending inward in the radial direction from the second yoke portion 11B. The number of second tooth portions 12B is nine in this example. The second tooth portion 12B has a second tooth end portion 13B at its inner end in the radial direction. The second tooth end portion 13B has a width wider than widths of other portions of the second tooth portion 12B.

The second core portion 10B has a configuration in which a plurality of split cores 9B each including one second tooth portion 12B are connected together in an annular shape at the above-described split surface portions 15.

Figure 3:
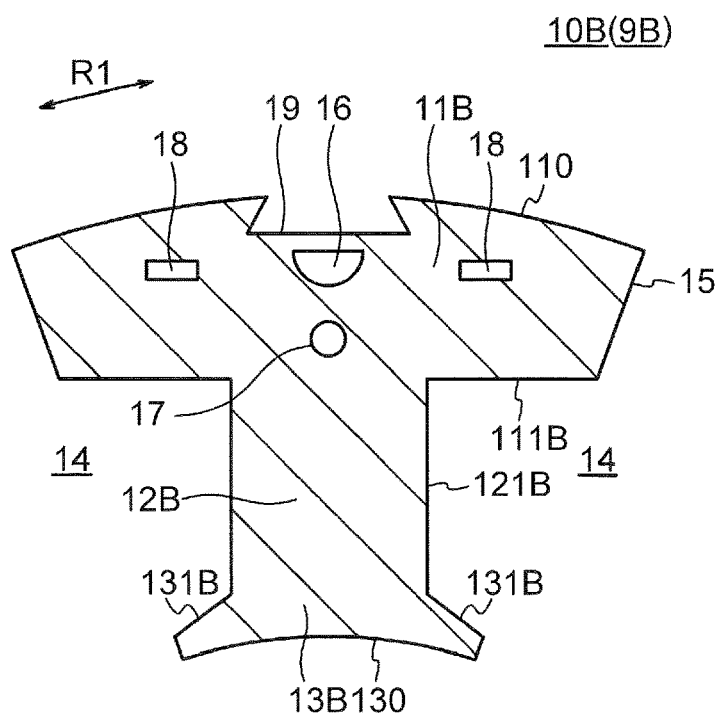
FIG. 3 is an enlarged cross-sectional view showing a part of the second core portion of the first embodiment.

FIG. 3 is a diagram showing one split core 9B of the second core portion 10B. The second yoke portion 11B has an outer circumferential surface 110 on the outer side in the radial direction and an inner circumferential surface 111B on the inner side in the radial direction. The second tooth portion 12B has side surfaces 121B on both sides in the circumferential direction. The second tooth end portion 13B has an end surface 130 facing the rotor 5 and outer circumferential surfaces 131B on the outer side in the radial direction.

The inner circumferential surface 111B of the second yoke portion 11B, the side surface 121B of the second tooth portion 12B, and the outer circumferential surface 131B of the second tooth end portion 13B face the slot 14.

A concave portion 19 is formed on the outer circumferential surface 110 of the second yoke portion 11B. The concave portion 19 is a portion with which a jig for holding the stator core 10 is engaged during the winding operation of the coil 4. Further, the concave portion 19 is a portion serving as a refrigerant flow path in a state where the motor 100 is mounted in the compressor. The concave portion 19 is located, for example, on a straight line in the radial direction that passes through a center of the second tooth portion 12B in the width direction.

A fixing hole 16 into which a protrusion 26 (FIG. 6(B)) of the insulator 2 described later is press-fitted is formed in the second yoke portion 11B. The fixing hole 16 is located on a straight line in the radial direction that passes through the center of the second tooth portion 12B in the width direction, but is not limited to this position. A cross-sectional shape of the fixing hole 16 is a semicircular shape in this example, but is not limited to the semicircular shape.

The second yoke portion 11B has crimping portions 17 and 18 for fixing the steel laminations 101 of the second core portion 10B to each other. The crimping portion 17 is formed on the inner side of the fixing hole 16 in the radial direction. Two crimping portions 18 are formed one on each side of the fixing hole 16 in the circumferential direction. The positions of the crimping portions 17 and 18 are not limited to these positions. The crimping portion 17 is a circular crimping portion (see FIGS. 10(A) and 10(B)), and the crimping portion 18 is a V-shaped crimping portion (see FIGS. 9(A) and 9(B)). However, the crimping portion is not limited to the circular crimping portion, and the crimping portion 18 is not limited to the V-shaped crimping portion.

Figure 4:
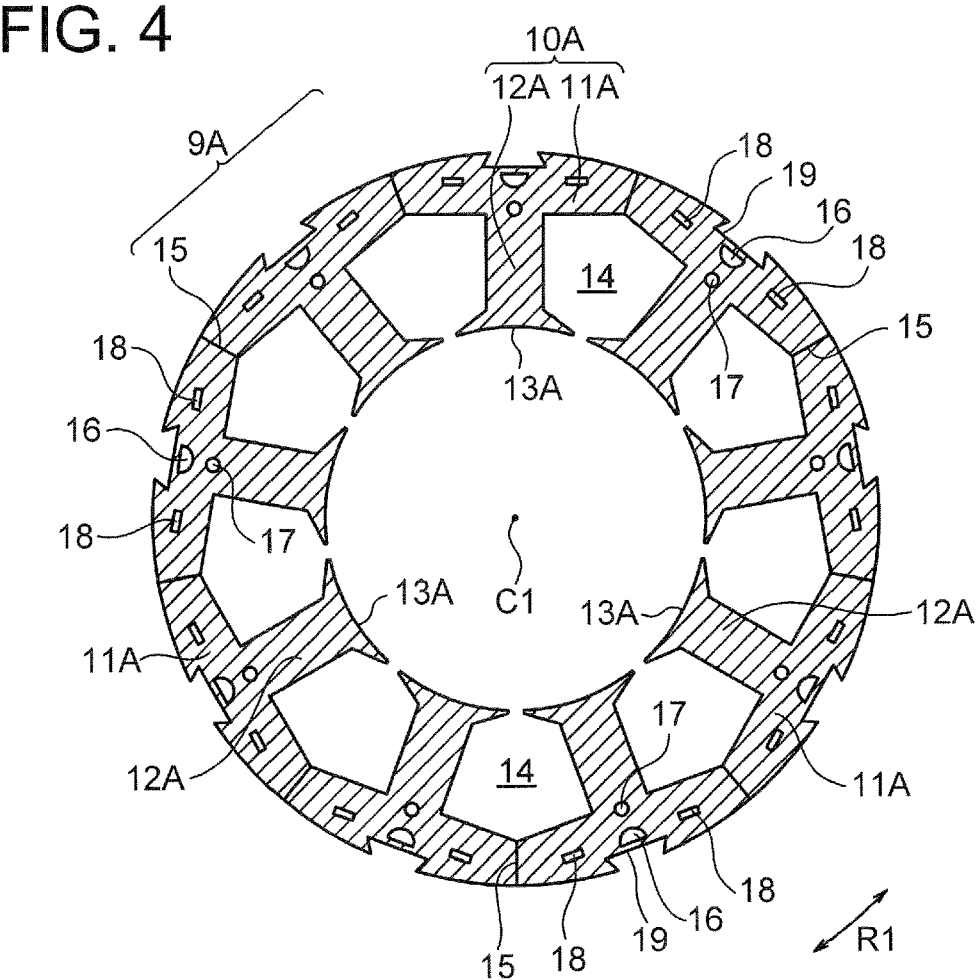
FIG. 4 is a cross-sectional view showing a first core portion of the first embodiment.

FIG. 4 is a plan view showing the first core portion 10A. The first core portion 10A is composed of steel laminations 101 (FIG. 8) which are stacked in the axial direction and integrated together by crimping or the like. Each of the steel laminations 101 is, for example, an electromagnetic steel sheet. A sheet thickness of each of the steel laminations 101 and a lamination gap between the steel laminations 101 will be described later.

The first core portion 10A has an annular first yoke portion 11A and a plurality of first tooth portions 12A extending inward in the radial direction from the first yoke portion 11A. The number of first tooth portions 12A is nine in this example. The first tooth portion 12A has a first tooth end portion 13A at its inner end in the radial direction. The first tooth end portion 13A has a width wider than widths of other portions of the first tooth portion 12A.

The first core portion 10A has a configuration in which a plurality of split cores 9A each including one first tooth portion 12A are connected together in an annular shape at the above-described split surface portions 15.

Figure 5:
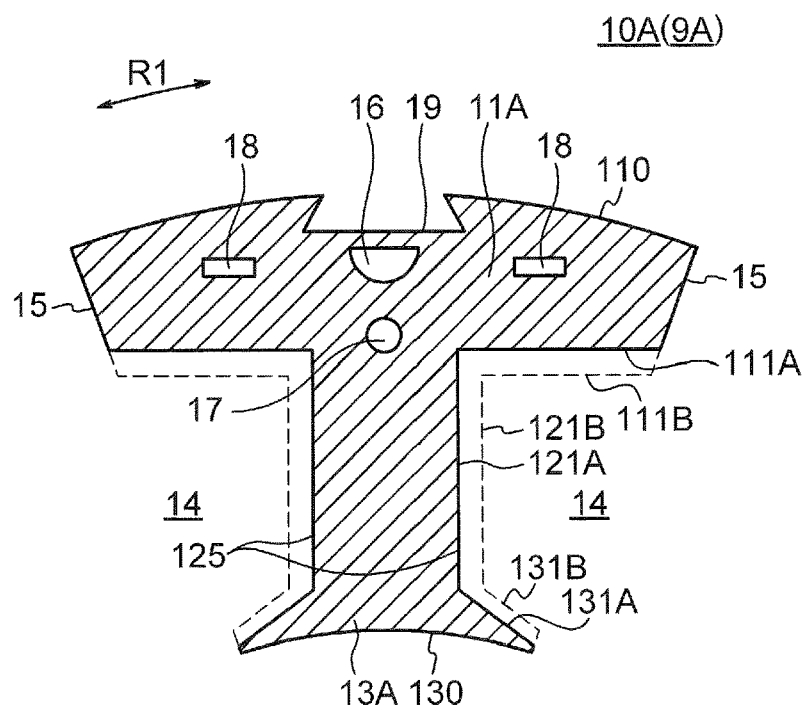
FIG. 5 is an enlarged cross-sectional view showing a part of the first core portion of the first embodiment.

FIG. 5 is a diagram showing one split core 9A of the first core portion 10A. In FIG. 5, an outline of the split core 9B (FIG. 3) of the second core portion 10B is shown by a dashed line. The first yoke portion 11A has an outer circumferential surface 110 on the outer side in the radial direction and an inner circumferential surface 111A on the inner side in the radial direction. The first tooth portion 12A has side surfaces 121A on both sides in the circumferential direction. The first tooth end portion 13A has an end surface 130 facing the rotor 5 and outer circumferential surfaces 131A on the outer side in the radial direction.

The inner circumferential surface 111A of the first yoke portion 11A, the side surface 121A of the first tooth portion 12A, and the outer circumferential surface 131A of the first tooth end portion 13A all face the slot 14.

The inner circumferential surface 111A of the first yoke portion 11A is located on the outer side in the radial direction with respect to the inner circumferential surface 111B of the second yoke portion 11B. The side surfaces 121A of the first tooth portion 12A are located on the inner side in the width direction (circumferential direction) with respect to the side surfaces 121B of the second tooth portion 12B. The outer circumferential surfaces 131A of the first tooth end portion 13A are located on the inner side in the radial direction with respect to the outer circumferential surfaces 131B of the second tooth end portion 13B.

That is, the inner circumferential surface 111A of the first yoke portion 11A, the side surfaces 121A of the first tooth portion 12A, and the outer circumferential surfaces 131A of the first tooth end portion 13A are located at positions displaced in directions to increase the area of the slot 14.

Thus, a step portion 125 is formed in each of a portion adjacent to the inner circumferential surface 111A of the first yoke portion 11A, portions adjacent to the side surfaces 121A of the first tooth portion 12A, and portions adjacent to the outer circumferential surfaces 131A of the first tooth end portion 13A. In other words, the step portion 125 facing the slot 14 is formed.

The step portion 125 is not limited to such an arrangement. It is sufficient that at least one of the inner circumferential surface 111A of the first yoke portion 11A, the side surfaces 121A of the first tooth portion 12A, and the outer circumferential surfaces 131A of the first tooth end portion 13A (for example, the side surface 121A of the first tooth portion 12A) is displaced in the direction to increase the area of the slot 14, and the step portion 125 is provided at the displaced portion.

The outer circumferential surface 110 of the first yoke portion 11A is aligned with the outer circumferential surface 110 of the second yoke portion 11B (FIG. 3). The end surface 130 of the first tooth end portion 13A is aligned with the end surface 130 of the second tooth end portion 13B (FIG. 3).

The fixing holes 16, the crimping portions 17 and 18, and the concave portions 19 are formed in the first yoke portion 11A. The arrangement and shapes of the fixing holes 16, the crimping portions 17 and 18, and the concave portions 19 are the same as those formed in the second yoke portion 11B (FIG. 3).

FIG. 6(A) is a perspective view showing the stator core 10 (split core 9). As described above, the step portion 125 is formed in each of the portion adjacent to the inner circumferential surface 111A of the first yoke portion 11A, the portions adjacent to the side surfaces 121A of the first tooth portion 12A, and the portions adjacent to the outer circumferential surfaces 131A of the first tooth end portion 13A. The step portion 125 is a portion with which the insulator 2 described next is engaged.

FIG. 6(B) is a perspective view showing a state in which the insulators 2 and the insulating films 3 are attached to the stator core 10. One insulator 2 is attached to each of both end portions of the stator core 10 in the axial direction (i.e., the first core portions 10A). The insulator 2 is formed of, for example, a resin such as polybutylene terephthalate (PBT).

Each insulator 2 has a wall portion 25 attached to the yoke 11, a body portion 22 attached to the tooth 12, and a flange portion 21 attached to the tooth end portion 13. The flange portion 21 and the wall portion 25 face each other in the radial direction with the body portion 22 interposed therebetween.

The coil 4 is wound around the body portion 22. The flange portion 21 and the wall portion 25 guide the coil 4, which is wound around the body portion 22, from both sides in the radial direction. Each of the flange portion 21 and the wall portion 25 may be provided with a step 23 for positioning the coil 4 wound around the body portion 22.

The protrusion 26 (shown by a dashed line in FIG. 6(B)) is formed on the wall portion 25 of the insulator 2, and the protrusion 26 is press-fitted into the fixing hole 16 (FIG. 6(A)) of the stator core 10. The protrusion 26 protrudes in the axial direction and has a semicircular cross section. The cross-sectional shape of the protrusion 26 is not limited to a semicircular shape, and it is sufficient that the protrusion 26 has a cross-sectional shape corresponding to the fixing hole 16.

The insulating films 3 are attached to the surfaces of the second core portion 10B on the slot 14 side in the stator core 10. Each insulating film 3 is formed of a resin such as polyethylene terephthalate (PET). Each insulating film 3 covers the inner circumferential surface 111B of the second yoke portion 11B, the side surface 121B of the second tooth portion 12B, and the outer circumferential surface 131B (FIG. 6(A)) of the second tooth end portion 13B.

The insulator 2 and the insulating film 3 electrically insulate the stator core 10 from the coil 4 in the slot 14.

Figure 7A:
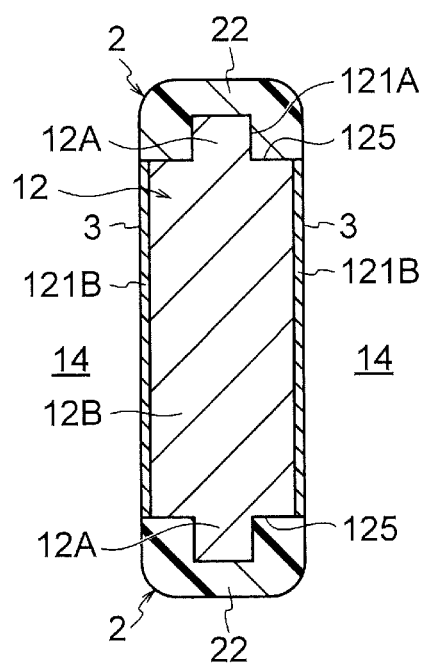
FIG. 7(A) is a diagram showing cross-sectional structures of a tooth, the insulators, and the insulating films of the first embodiment.

FIG. 7(A) is a cross-sectional view on a plane perpendicular to the radial direction showing the tooth 12 and the insulators 2 and the insulating films 3 surrounding the tooth 12. As described above, the step portions 125 are formed on both sides of the first tooth portion 12A in the circumferential direction. Each insulator 2 is engaged with the step portion 125 and is thereby attached to the end portion of the tooth 12 in the axial direction. As described above, the step portions 125 are also formed on the inner side in the radial direction of the inner circumferential surface 111A of the first yoke portion 11A (FIG. 6(A)) and on the outer side in the radial direction of the outer circumferential surface 131A of the first tooth end portion 13A (FIG. 6(A)).

With such a configuration, each insulator 2 is attached to the tooth 12 so as not to protrude from the tooth 12 to the slot 14 side. Thus, the area of the slot 14 can be increased, and thus the number of turns of the coil 4 can be increased.

Figure 7B:
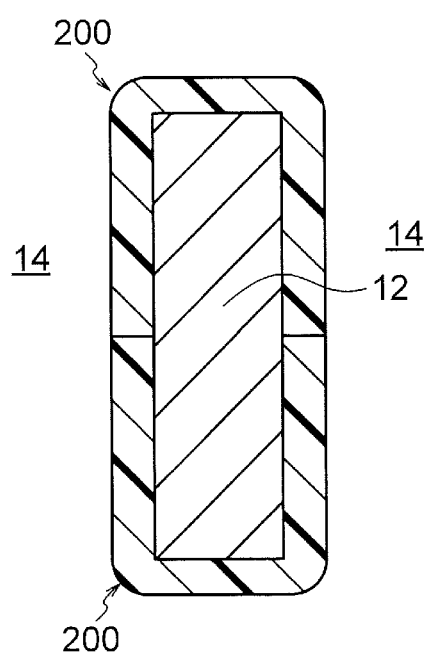
FIG. 7(B) is a diagram showing cross-sectional structures of those in Comparative Example for comparison.

FIG. 7(B) is a cross-sectional view corresponding to FIG. 7(A), showing the tooth 12 and the insulators 200 in Comparative Example. In Comparative Example, the tooth 12 has a rectangular sectional shape, and the insulators 200 are provided to surround the tooth 12 from both ends in the axial direction and both ends in the circumferential direction (i.e., both side surfaces). In Comparative Example, each insulator 200 protrudes to the slot 14 side, and thus the area of the slot 14 is smaller than in the configuration shown in FIG. 7(A).

(Configuration for Reducing Eddy Current Loss)

Next, a configuration for reducing eddy current loss will be described. FIG. 8 is a longitudinal-sectional view showing the motor 100. As described above, the stator core 10 is obtained by stacking a plurality of steel laminations 101 in the axial direction, and the rotor core 50 is obtained by stacking a plurality of steel laminations 501 in the axial direction. The stator core 10 and the rotor core 50 have the same length in the axial direction. In FIG. 8, the thicknesses of the steel laminations 101 and 501 are shown to be thick for convenience of illustration.

The sheet thickness T0 and the lamination gap L0 of the steel laminations 501 are both constant throughout the entire area of the rotor core 50 in the axial direction. The sheet thickness T0 refers to a thickness of each of the steel laminations 501. The lamination gap L0 refers to an interval (gap) between two steel laminations 501 overlapping each other in the axial direction.

The sheet thickness T0 of each of the steel laminations 501 of the rotor core 50 is, for example, 0.1 to 0.7 mm (for example, 0.35 mm). When the sheet thickness T0 is 0.35 mm, the lamination gap L0 is, for example, 0.003 mm.

The sheet thickness T1 and the lamination gap L1 of the steel laminations 101 of the stator core 10 are both constant throughout the entire area of the stator core 10 in the axial direction. The sheet thickness T1 refers to a thickness of each of the steel laminations 101. The lamination gap L1 refers to an interval (gap) between two steel laminations 101 overlapping each other in the axial direction.

The sheet thickness T1 of each of the steel laminations 101 is, for example, 0.1 to 0.7 mm (for example, 0.35 mm). When the sheet thickness T1 of each of the steel laminations 101 is 0.35 mm, the lamination gap L1 is, for example, 0.01 mm.

For example, when the length of the stator core 10 in the axial direction is 45 mm, the length of the first core portion 10A in the axial direction is 5 mm, while the length of the second core portion 10B in the axial direction is 35 mm.

In the first embodiment, the sheet thickness T0 of each of the steel laminations 501 of the rotor core 50 and the sheet thickness T1 of each of the steel laminations 101 of the stator core 10 are the same. Meanwhile, the lamination gap L0 of the steel laminations 501 of the rotor core 50 and the lamination gap L1 of the steel laminations 101 of the stator core 10 satisfy a relationship of L0<L1.

Figure 9A:
FIGS. 9(A) and 9(B) are a plan view and a cross-sectional view for explaining a V-shaped crimping portion.
Figure 9B:
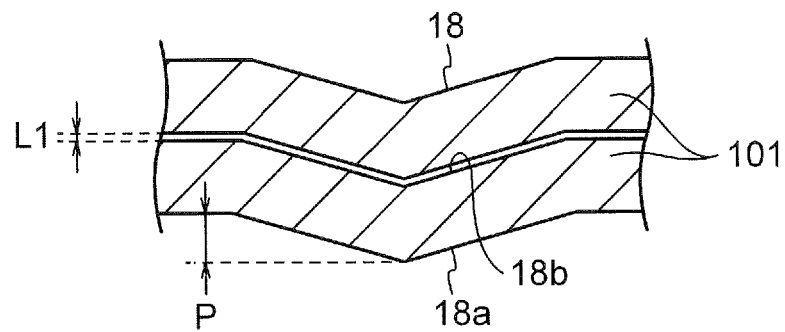

The lamination gap L1 of the steel laminations 101 can be adjusted by the shapes of the crimping portions 17 and 18 (FIG. 1). FIGS. 9(A) and 9(B) are a plan view and a cross-sectional view schematically showing the crimping portion 18 which is the V-shaped crimping portion. The crimping portion 18 is formed by stamping the steel lamination 101. For example, the plurality of steel laminations 101 are fixed to each other by fitting a V-shaped convex portion 18a formed on a lower surface of one steel lamination 101 into a V-shaped concave portion 18b formed on an upper surface of the subjacent steel lamination 101. By adjusting a protruding amount of the convex portion 18a, i.e., a depth P (referred to as a crimping depth) of the concave portion 18b during the stamping, the lamination gap L1 of the steel laminations 101 can be adjusted.

Figure 10A:
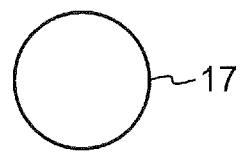
FIGS. 10(A) and 10(B) are a plan view and a cross-sectional view for explaining a circular crimping portion.
Figure 10B:
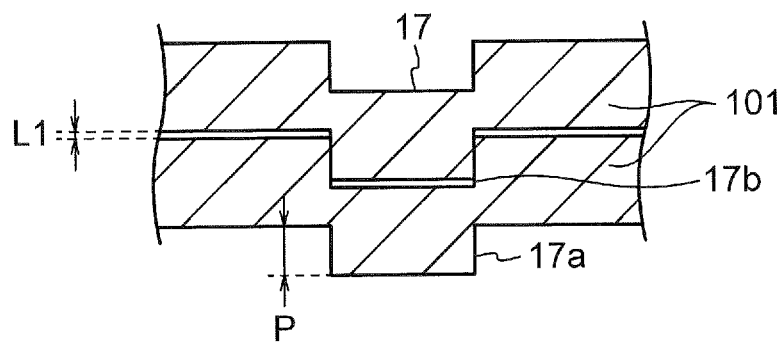

FIGS. 10(A) and 10(B) are a plan view and a cross-sectional view schematically showing the crimping portion 17 which is the circular crimping portion. The crimping portion 17 is formed by stamping the steel lamination 101. For example, the plurality of steel laminations 101 are fixed to each other by fitting a cylindrical convex portion 17a formed on a lower surface of one steel lamination 101 into a cylindrical concave portion 17b formed on an upper surface of the subjacent steel lamination 101. By adjusting a protruding amount of the convex portion 17a, i.e., a depth P (referred to as a crimping depth) of the concave portion 17b during the stamping, the lamination gap L1 of the steel laminations 101 can be adjusted.

Although FIGS. 9(A) through 10(B) show the crimping portions 17 and 18 of the steel laminations 101 of the stator core 10, the lamination gap L0 of the steel laminations 501 of the rotor core 50 can also be adjusted in the same manner. In the first embodiment, the crimping depth of the steel laminations 101 of the stator core 10 is greater than the crimping depth of the steel laminations 501 of the rotor core 50.

(Action)

Figure 11:
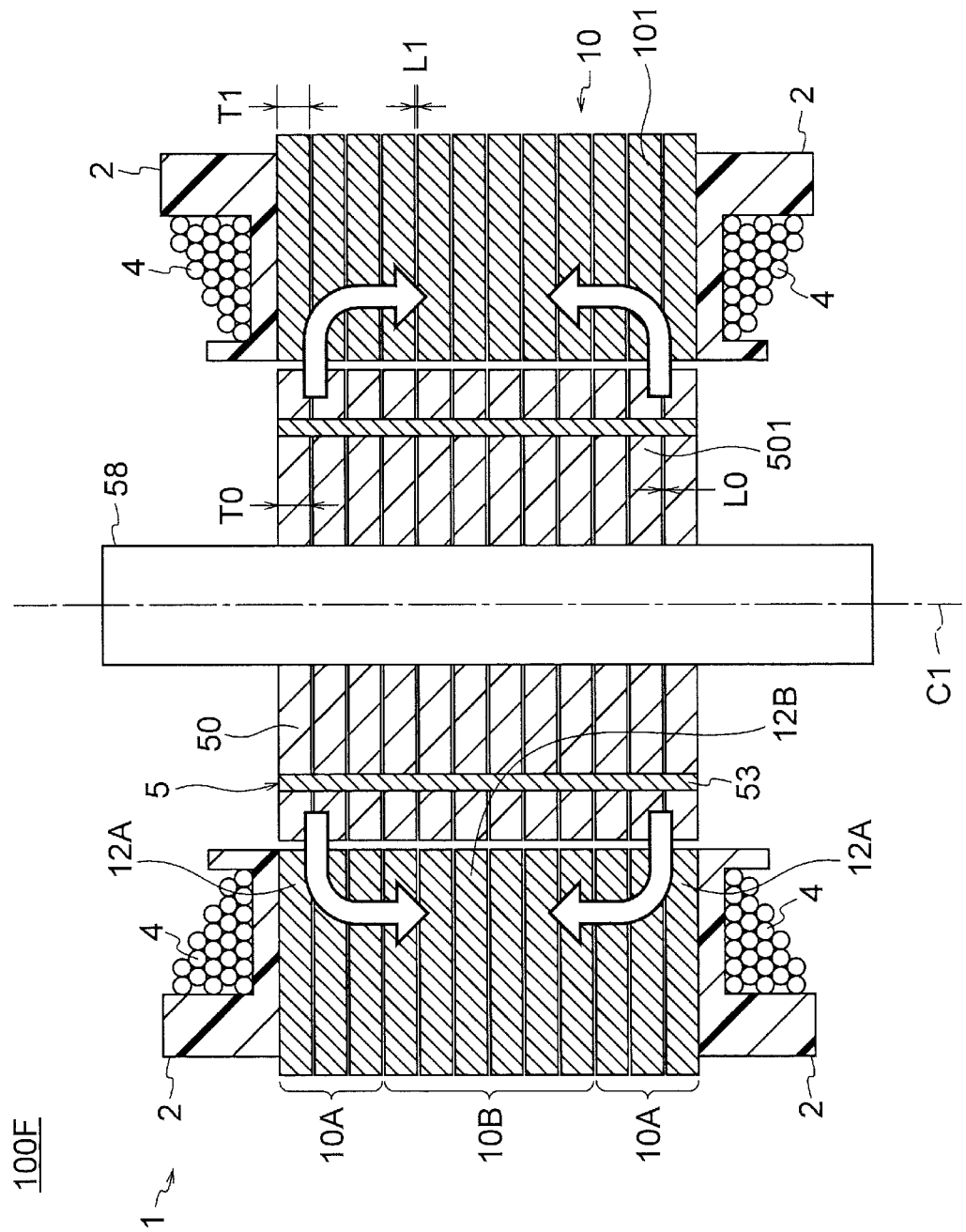
FIG. 11 is a longitudinal-sectional view showing a motor of Comparative Example.

Next, an action of the motor 100 of the first embodiment will be described. FIG. 11 is a longitudinal-sectional view showing a motor 100F of Comparative Example. For convenience of description, components of the motor 100F of Comparative Example are described using the same reference signs as the components of the motor 100 of the first embodiment.

The stator core 10 of the motor 100F of Comparative Example is composed of steel laminations 101 each having a sheet thickness T1 which are stacked in the axial direction with lamination gaps L1. This lamination gap L1 is the same as the lamination gap L0 of the steel laminations 501 of the rotor core 50 (L1=L0). Other structures of the motor 100F are the same as those of the motor 100.

As in the first embodiment, the stator core 10 of the motor 100F of Comparative Example has a first core portion 10A and a second core portion 10B, and a first tooth portion 12A of the first core portion 10A is narrower than a second tooth portion 12B of the second core portion 10B (see FIG. 5). Thus, when the magnetic flux from the permanent magnet 53 of the rotor 5 flows into the first tooth portion 12A, the magnetic flux density tends to be high in the first tooth portion 12A.

When the magnetic flux density is saturated in the first tooth portion 12A, part of the magnetic flux flows in the axial direction toward the second tooth portion 12B having a wider width. That is, the magnetic flux flows in the direction perpendicular to the sheet surfaces of the steel laminations 101 of the stator core 10, and thus the eddy current may be generated.

Figure 12:
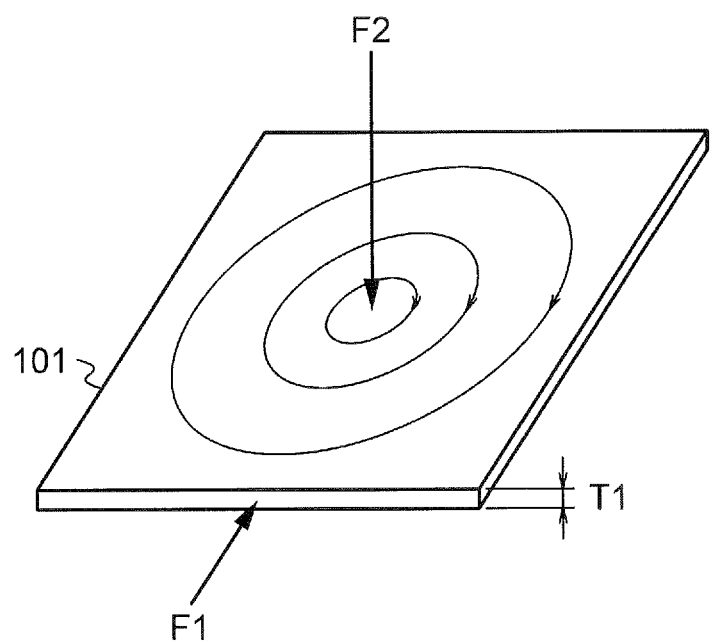
FIG. 12 is a schematic diagram for explaining generation of eddy current in a steel lamination.

FIG. 12 is a schematic diagram for explaining generation of eddy current in the steel lamination 101. The steel lamination 101 is thin and has a thickness T1 of, for example, 0.1 to 0.7 mm. Thus, eddy current is less likely to be generated when the magnetic flux enters the steel lamination 101 from its end surface as indicated by the arrow F1.

In contrast, eddy current is more likely to be generated when the magnetic flux enters the steel lamination 101 in the direction perpendicular to its sheet surface as indicated by the arrow F2.

For this reason, as in Comparative Example shown in FIG. 11, when the magnetic flux flows in the axial direction in the stator core 10 from the first tooth portion 12A toward the second tooth portion 12B, eddy current loss (iron loss) may occur, which may lead to reduction in the motor efficiency.

In contrast, as shown in FIG. 8, in the motor 100 of the first embodiment, the lamination gap L1 of the steel laminations 101 constituting the stator core 10 is greater than the lamination gap L0 of the steel laminations 501 constituting the rotor core 50 (L0<L1).

In other words, the number of steel laminations 101 per unit length (more specifically, the unit length in the axial direction) of the stator core 10 is smaller than the number of steel laminations 501 per unit length of the rotor core 50. Thus, in the stator core 10, a magnetic resistance in the axial direction is higher and the magnetic flux is less likely to flow in the axial direction as compared to in the rotor core 50.

Therefore, when the magnetic flux density is saturated in the first tooth portion 12A, part of the magnetic flux flows in the axial direction in a region of the rotor core 50 on the outer circumferential side of the magnet insertion hole 51 and then enters the second tooth portion 12B. Since the second tooth portion 12B is wide, magnetic saturation is less likely to occur in the second tooth portion 12B, and the flow of magnetic flux in the axial direction is less likely to occur.

As a result, the magnetic flux flowing in the axial direction in the stator core 10 can be reduced, and thus the generation of the eddy current described with reference to FIG. 12 can be suppressed. That is, the eddy current loss can be suppressed, and the motor efficiency can be enhanced.

In the first embodiment, as described above, the magnetic flux flows in the axial direction in the region of the rotor core 50 on the outer circumferential side of the magnet insertion hole 51. Since a position of the permanent magnet 53 relative to the rotor core 50 does not change during the rotation of the rotor 5, a change in the magnetic flux density inside the rotor core 50 during the rotation of the rotor 5 is small. Therefore, an increase in the eddy current loss due to the magnetic flux flowing in the axial direction in the region of the rotor core 50 on the outer circumferential side of the magnet insertion hole 51 is relatively small.

In contrast, in the stator core 10, a positional relationship between the tooth 12 and the permanent magnet 53 changes during the rotation of the rotor 5, and thus a change in the magnetic flux density inside the stator core 10 during the rotation of the rotor 5 is large. Thus, the eddy current loss is more likely to increase due to the flow of the magnetic flux flowing in the axial direction in the stator core 10. For this reason, in the first embodiment, the stator core 10 has a configuration in which the magnetic flux is less likely to flow in the axial direction as compared to in the rotor core 50. This configuration reduces the eddy current loss.

Figure 13:
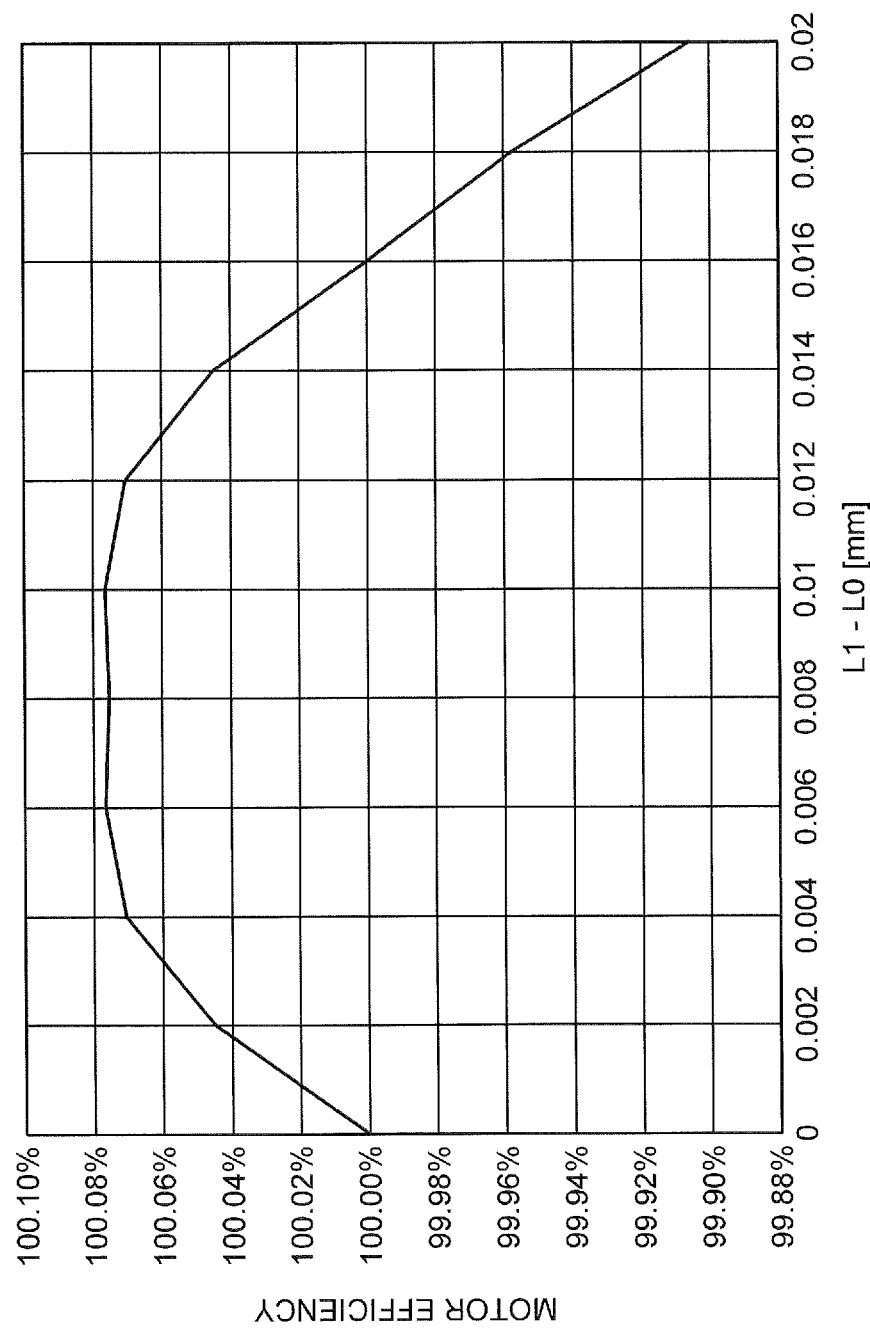
FIG. 13 is a graph showing a relationship between a motor efficiency and a difference $L1-L0$ between lamination gaps of the steel laminations.

FIG. 13 is a graph showing a relationship between the motor efficiency and a difference (L1−L0) between the lamination gap L1 of the steel laminations 101 of the stator core 10 and the lamination gap L0 of the steel laminations 501 of the rotor core 50. FIG. 13 shows a change in the motor efficiency when the lamination gap L0 is set to 0.003 mm and the lamination gap L1 is varied. The motor efficiency is expressed as a ratio to the motor efficiency when L1=L0=0.003 mm is satisfied.

From FIG. 13, it is understood that especially high motor efficiency (of 100.07% or more) can be obtained when the difference L1−L0 in the lamination gap is within a range of 0.004 to 0.012 mm. The reason is as follows. As the difference L1−L0 in the lamination gap increases, the magnetic flux is less likely to flow in the axial direction in the stator core 10, and thus the eddy current loss decreases. On the other hand, when the lamination gap L1 is excessively large, iron loss of the stator core 10 itself increases. Therefore, the difference L1−L0 in the lamination gap is desirably within the range of 0.004 to 0.012 mm.

Effects of Embodiment

As described above, in the first embodiment, the stator core 10 has the first core portion 10A at the end portion of the stator core in the axial direction and the second core portion 10B at the center portion of the stator core in the axial direction, and the area of the slot 14 is larger in the first core portion 10A than in the second core portion 10B. Further, the lamination gap L0 of the steel laminations 501 of the rotor core 50 and the lamination gap L1 of the steel laminations 101 of the stator core 10 satisfy L0<L1. Thus, in the stator core 10, the magnetic resistance in the axial direction is higher and the magnetic flux is less likely to flow in the axial direction as compared to in the rotor core 50. Consequently, the generation of eddy current in the steel laminations 101 of the stator core 10 can be suppressed even when the magnetic saturation occurs in the first tooth portion 12A of the first core portion 10A. That is, the eddy current loss can be reduced, and the motor efficiency can be enhanced.

The width in the circumferential direction of the first tooth portion 12A in the first core portion 10A of the stator core 10 is narrower than the width of the second tooth portion 12B in the circumferential direction in the second core portion 10B. Thus, the step portion 125 can be formed on the side of the first tooth portion 12A, and the insulator 2 can be engaged with the step portion 125.

The crimping depth of the steel laminations 101 of the stator core 10 is greater than the crimping depth of the steel laminations 501 of the rotor core 50, and thus the above-described relationship (L0<L1) between the lamination gaps L0 and L1 can be achieved with a simple configuration.

The difference L1−L0 in the lamination gap between the steel laminations 101 of the stator core 10 and the steel laminations 501 of the rotor core 50 satisfies 0.004 mm≤L1−L0≤0.012 mm. Thus, the effect of reducing the eddy current loss can be enhanced, and the motor efficiency can be further enhanced.

Since the permanent magnet 53 is a rare earth magnet and has a high residual magnetic flux density, magnetic saturation is more likely to occur in the first tooth portion 12A. Therefore, the effect of suppressing the eddy current loss according to the first embodiment is exhibited more effectively.

The magnet insertion hole 51 of the rotor core 50 is formed in the V shape such that its center portion in the circumferential direction protrudes inward in the radial direction, and thus the magnetic flux is more likely to flow in the axial direction in the region on the outer circumferential side of the magnet insertion hole 51. Thus, the effect of reducing the eddy current loss in the stator core 10 can be enhanced.

The insulator 2 is engaged with the step portion 125 between the first core portion 10A and the second core portion 10B of the stator core 10, so that the protruding amount of the insulator 2 toward the slot 14 side can be reduced. Thus, the area of the slot 14 can be increased and the number of turns of the coil 4 can be increased. As a result, a coil resistance (i.e., copper loss) can be reduced, and the motor efficiency can be further enhanced.

Since the insulating film 3 is provided on the inner surface of the slot 14 of the stator core 10, the coil 4 and the stator core 10 can be insulated from each other and the area of the slot 14 can be secured.

Second Embodiment

Figure 14:
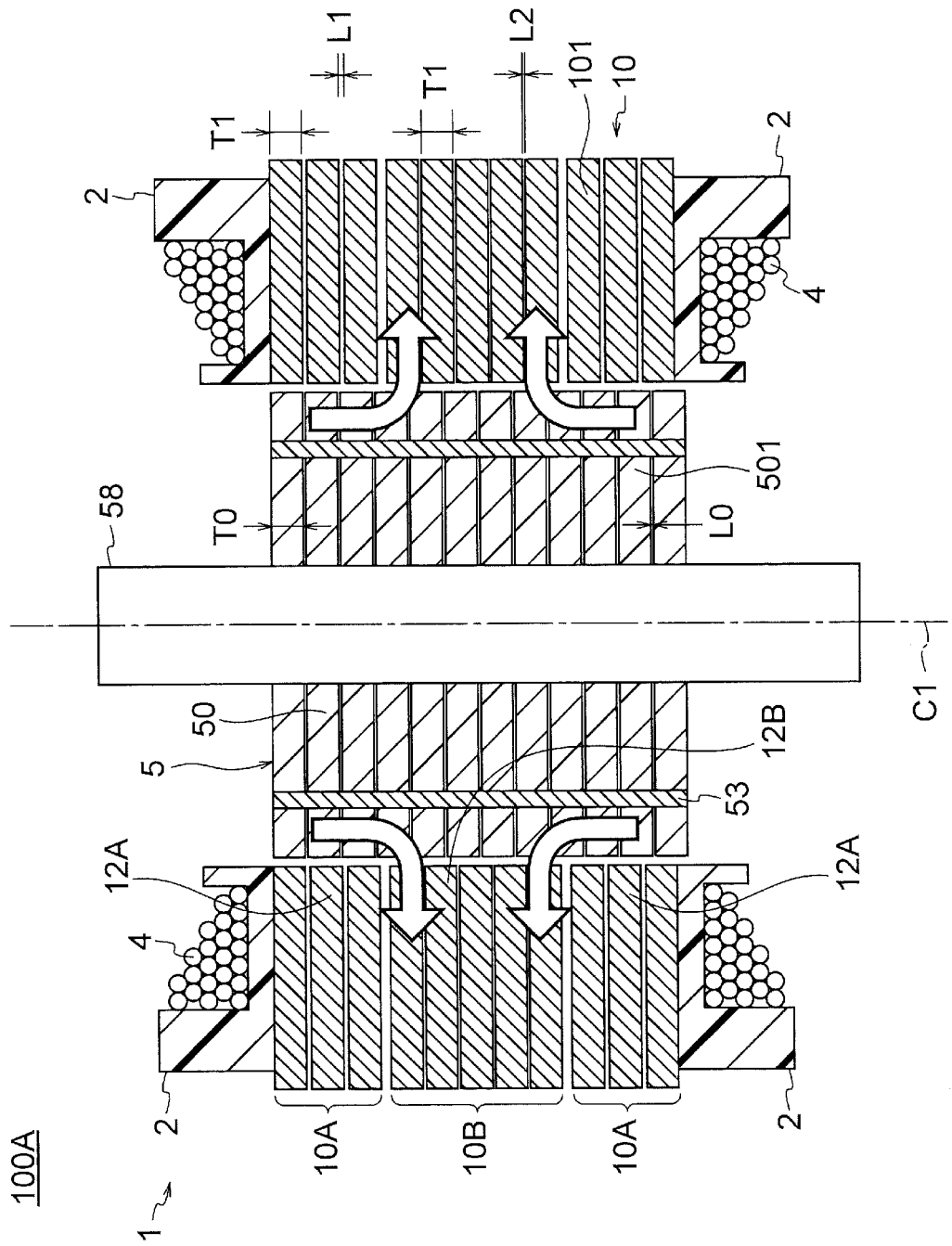
FIG. 14 is a longitudinal-sectional view showing a motor of a second embodiment.

FIG. 14 is a longitudinal-sectional view showing a motor 100A of a second embodiment. In the first embodiment described above, the steel laminations 101 of the stator core 10 are stacked with the equal lamination gaps L1. In contrast, in the second embodiment, the first core portion 10A and the second core portion 10B of the stator core 10 differ in the lamination gap of the steel laminations 101.

More specifically, the lamination gap L1 of the steel laminations 101 of the first core portion 10A, the lamination gap L2 of the steel laminations 101 of the second core portion 10B, and the lamination gap L0 of the steel laminations 501 of the rotor core 50 satisfy the relationship of L0≤L2<L1.

That is, the crimping depth of the steel laminations 101 of the first core portion 10A is greater than the crimping depth of the steel laminations 101 of the second core portion 10B. The crimping depth of the steel laminations 101 of the second core portion 10B is greater than or equal to the crimping depth of the steel laminations 501 of the rotor core 50.

In other words, the number of steel laminations 101 per unit length of the first core portion 10A is smaller than the number of steel laminations 101 per unit length of the second core portion 10B. In addition, the number of steel laminations 101 per unit length of the second core portion 10B is smaller than or equal to the number of steel laminations 501 per unit length of the rotor core 50.

Thus, in the second embodiment, the magnetic resistance in the axial direction in the first core portion 10A is higher than the magnetic resistance in the axial direction in the second core portion 10B. Further, the magnetic resistance in the axial direction in the second core portion 10B is higher than or equal to the magnetic resistance in the axial direction in the rotor core 50.

In the second embodiment, due to the above-described relationship of L0≤L2<L1, the magnetic flux is least likely to flow in the axial direction in the first core portion 10A, while the magnetic flux is most likely to flow in the axial direction in the region of the rotor core 50 on the outer circumferential side of the magnet insertion hole 51. Therefore, when the magnetic saturation occurs in the first tooth portion 12A, the magnetic flux flows in the axial direction in the region of the rotor core 50 on the outer circumferential side of the magnet insertion hole 51.

As a result, the magnetic flux flowing in the axial direction in the stator core 10 can be reduced, and thus the generation of the eddy current can be suppressed as in the first embodiment. That is, the eddy current loss (iron loss) can be suppressed, and the motor efficiency can be enhanced.

The difference (L1−L0) between the lamination gap L1 of the steel laminations 101 of the first core portion 10A of the stator core 10 and the lamination gap L0 of the steel laminations 501 of the rotor core 50 is desirably within the range of 0.004 to 0.012 mm as in the first embodiment.

The configuration of the motor 100A of the second embodiment is the same as that of the motor 100 of the first embodiment (FIG. 8) except for the configuration of the stator core 10.

As described above, in the second embodiment, the lamination gap L0 of the steel laminations 501 of the rotor core 50, the lamination gap L1 of the steel laminations 101 of the first core portion 10A in the stator core 10, and the lamination gap L2 of the steel laminations 101 of the second core portion 10B in the stator core 10 satisfy the relationship of L0≤L2<L1. Thus, the magnetic flux is least likely to flow in the axial direction in the first core portion 10A, and the magnetic flux is most likely to flow in the axial direction in the region of the rotor core 50 on the outer circumferential side of the magnet insertion hole 51. Therefore, the flow of the magnetic flux in the axial direction in the stator core 10 can be reduced, and thus the eddy current loss can be reduced and the motor efficiency can be enhanced.

Third Embodiment

Figure 15:
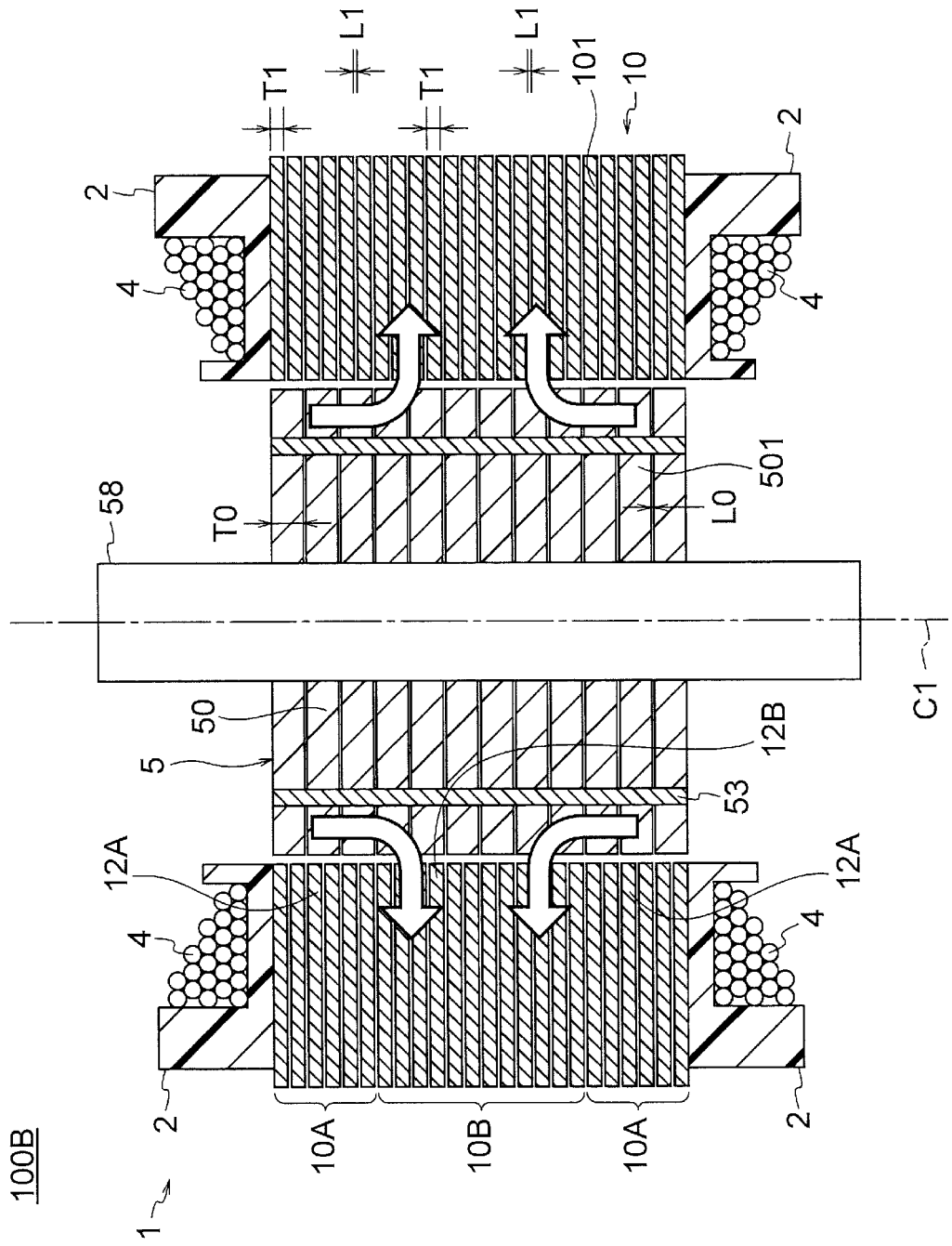
FIG. 15 is a longitudinal-sectional view showing a motor of a third embodiment.

FIG. 15 is a longitudinal-sectional view showing a motor 100B of a third embodiment. In the first embodiment described above, the sheet thickness T1 of each of the steel laminations 101 of the stator core 10 and the sheet thickness T0 of each of the steel laminations 501 of the rotor core 50 are the same. In contrast, in the third embodiment, the stator core 10 and the rotor core 50 differ in the sheet thickness of the steel laminations 101 and 501.

More specifically, the sheet thickness T0 of each of the steel laminations 501 of the rotor core 50 is thicker than the sheet thickness T1 of each of the steel laminations 101 of the stator core 10. In other words, the sheet thickness T0 of each of the steel laminations 501 of the rotor core 50 and the sheet thickness T1 of each of the steel laminations 101 of the stator core 10 satisfy a relationship of T0>T1.

The sheet thickness T0 of each of the steel laminations 501 of the rotor core 50 is, for example, 0.35 mm, while the sheet thickness T1 of each of the steel laminations 101 of the stator core 10 is, for example, 0.25 mm.

The lamination gap L1 of the steel laminations 101 of the stator core 10 and the lamination gap L0 of the steel laminations 501 of the rotor core 50 are the same (L0=L1) in this example.

As the sheet thickness of each of the steel laminations decreases, the number of steel laminations per unit length increases. For this reason, even when the lamination gaps L0 and L1 of the steel laminations 101 and 501 are the same, a sum of lamination gaps L1 of the steel laminations 101 per unit length is greater than a sum of lamination gaps L0 of the steel laminations 501 per unit length.

Thus, in the stator core 10, the magnetic resistance in the axial direction is higher and the magnetic flux is less likely to flow in the axial direction as compared to in the rotor core 50. Therefore, when the magnetic flux density is saturated in the first tooth portion 12A, the magnetic flux flows in the axial direction in the rotor core 50.

As a result, the magnetic flux flowing in the axial direction in the stator core 10 can be reduced, and thus the generation of the eddy current can be suppressed as in the first embodiment. That is, the eddy current loss can be reduced, and the motor efficiency can be enhanced.

Figure 16:
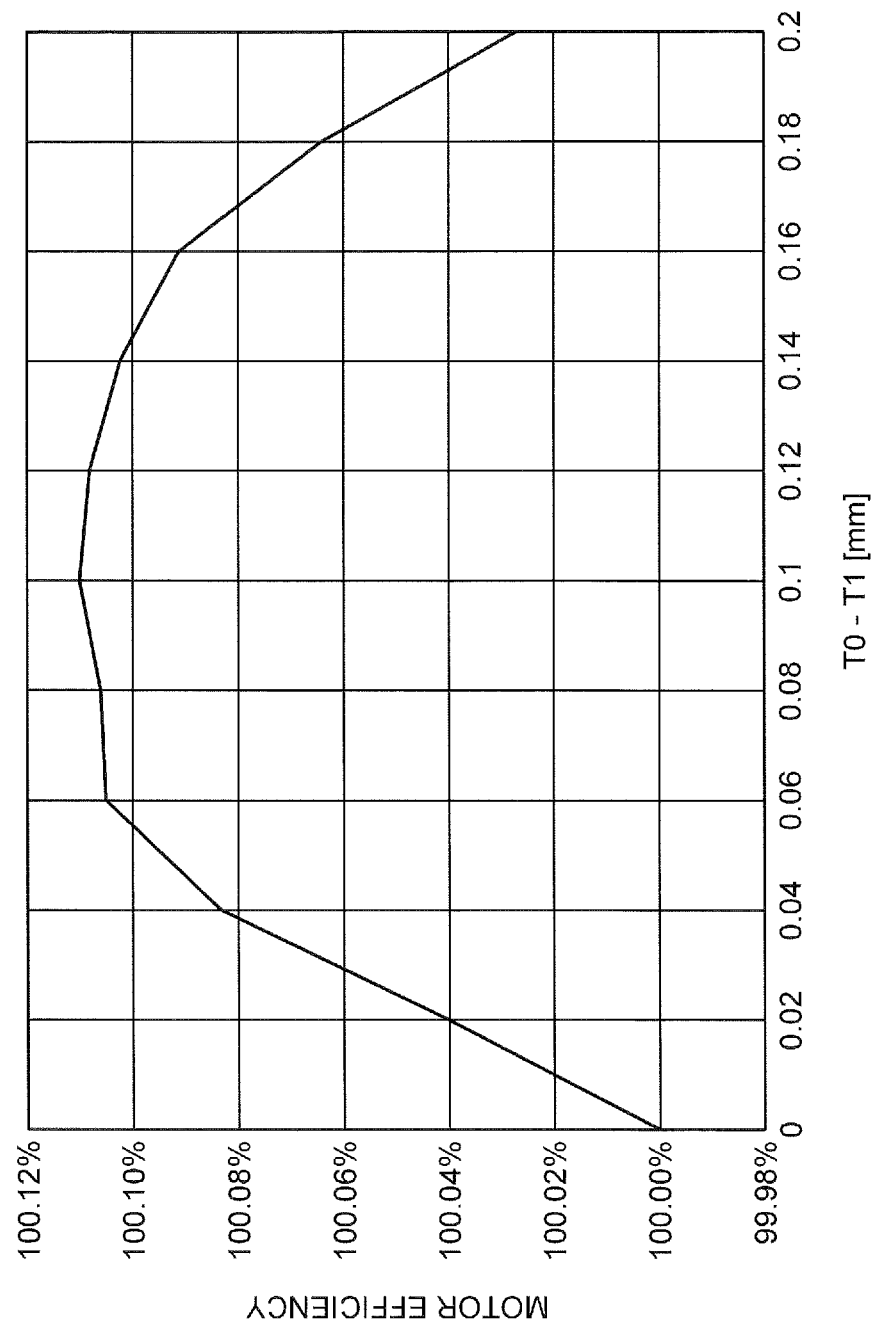
FIG. 16 is a graph showing a relationship between a motor efficiency and a difference $T0-T1$ between sheet thicknesses of the steel laminations.

FIG. 16 is a graph showing a relationship between the motor efficiency and a difference (T0−T1) between the sheet thickness T0 of the steel lamination 501 of the rotor core 50 and the sheet thickness T1 of the steel lamination 101 of the stator core 10. FIG. 16 shows a change in the motor efficiency when the sheet thickness T0 is set to 0.35 mm and the sheet thickness T1 is varied. The motor efficiency is expressed as a ratio to the motor efficiency when T0=T1=0.35 mm is satisfied.

From FIG. 16, it is understood that especially high motor efficiency (of 100.10% or more) can be obtained when the difference T0−T1 in the sheet thickness is within a range of 0.05 mm to 0.15 mm. The reason is as follows. As the difference T0−T1 in the sheet thickness increases, the magnetic flux is less likely to flow in the axial direction in the stator core 10, and thus the eddy current loss decreases. On the other hand, when the sheet thickness T1 is excessively thin, a hysteresis loss of the stator core 10 increases. Therefore, the difference T0−T1 in the sheet thickness is desirably within the range of 0.05 mm to 0.15 mm.

The configuration of the motor 100B of the third embodiment is the same as that of the motor 100 of the first embodiment (FIG. 8) except for the configuration of the stator core 10.

As described above, in the third embodiment, the sheet thickness T0 of each of the steel laminations 501 of the rotor core 50 and the sheet thickness T1 of each of the steel laminations 101 of the stator core 10 satisfy the relationship of T0>T1. Thus, in the stator core 10, the magnetic flux is less likely to flow in the axial direction as compared to in the rotor core 50. Thus, the generation of eddy current in the steel laminations 101 of the stator core 10 can be suppressed. That is, the eddy current loss can be reduced, and the motor efficiency can be enhanced.

The difference T0−T1 in the sheet thickness between the steel lamination 501 of the rotor core 50 and the steel lamination 101 of the stator core 10 satisfies 0.05 mm≤T0−T1≤0.15 mm. Thus, the effect of reducing the eddy current loss can be enhanced, and the motor efficiency can be further enhanced.

The lamination gap L1 of the steel laminations 101 of the stator core 10 and the lamination gap L0 of the steel laminations 501 of the rotor core 50 are the same (L0=L1) in this example. However, the lamination gaps L0 and L1 may satisfy L0<L1 as in the first embodiment. In this case, the difference (L1−L0) in the lamination gap is desirably within the range of 0.004 to 0.012 mm.

Alternatively, as in the second embodiment, the lamination gap L1 of the steel laminations 101 of the first core portion 10A, the lamination gap L2 of the steel laminations 101 of the second core portion 10B, and the lamination gap L0 of the steel laminations 501 of the rotor core 50 may satisfy the relationship of L0≤L2<L1.

Fourth Embodiment

Figure 17:
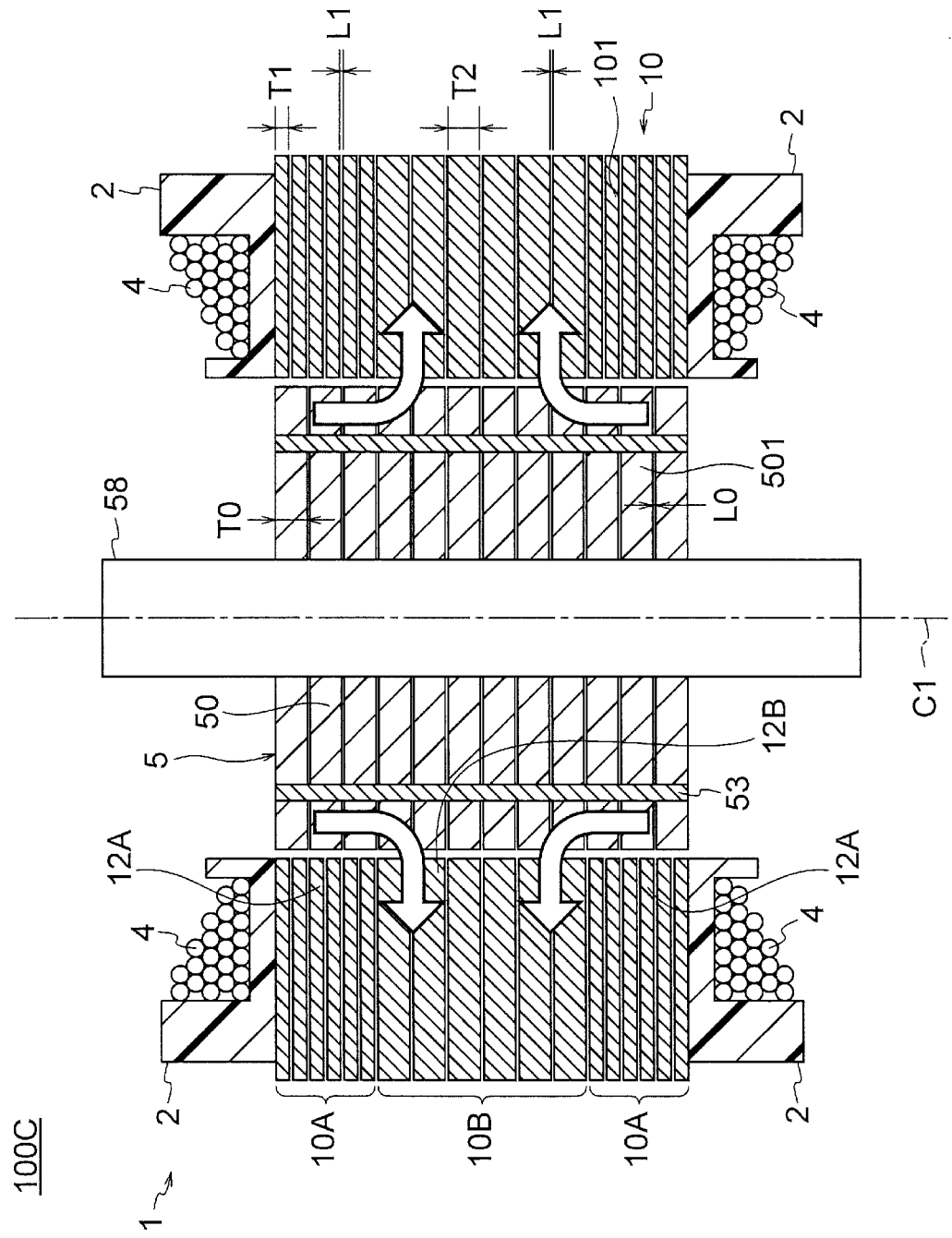
FIG. 17 is a longitudinal-sectional view showing a motor of a fourth embodiment.

FIG. 17 is a longitudinal-sectional view showing a motor 100C of a fourth embodiment. In the third embodiment described above, the sheet thickness T1 of each of the steel laminations 101 of the stator core 10 is constant. In contrast, in the fourth embodiment, the first core portion 10A and the second core portion 10B of the stator core 10 differ in the sheet thickness of the steel laminations 101.

More specifically, the sheet thickness T0 of each of the steel laminations 501 of the rotor core 50, the sheet thickness T1 of each of the steel laminations 101 of the first core portion 10A, and the sheet thickness T2 of each of the steel laminations 101 of the second core portion 10B satisfy the relationship of T0≥T2>T1.

In other words, the number of steel laminations 101 per unit length of the first core portion 10A is smaller than the number of steel laminations 101 per unit length of the second core portion 10B. Further, the number of steel laminations 101 per unit length of the second core portion 10B is smaller than or equal to the number of steel laminations 501 per unit length of the rotor core 50.

Thus, in the fourth embodiment, the magnetic resistance in the axial direction in the first core portion 10A is higher than the magnetic resistance in the axial direction in the second core portion 10B. Further, the magnetic resistance in the axial direction in the second core portion 10B is higher than or equal to the magnetic resistance in the axial direction in the rotor core 50.

In the fourth embodiment, due to the above-described relationship of T0≥T2>T1, the magnetic flux is least likely to flow in the axial direction in the first core portion 10A, and the magnetic flux is most likely to flow in the axial direction in the region of the rotor core 50 on the outer circumferential side of the magnet insertion hole 51. Therefore, when the magnetic saturation occurs in the first tooth portion 12A, the magnetic flux flows in the axial direction in the region of the rotor core 50 on the outer circumferential side of the magnet insertion hole 51.

As a result, the magnetic flux flowing in the axial direction in the stator core 10 can be reduced, and thus the generation of the eddy current is suppressed as in the first embodiment. That is, the eddy current loss can be reduced, and the motor efficiency can be enhanced.

The configuration of the motor 100C of the fourth embodiment is the same as that of the motor 100 of the first embodiment (FIG. 8) except for the configuration of the stator core 10.

As described above, in the fourth embodiment, the sheet thickness T0 of each of the steel laminations 501 of the rotor core 50, the sheet thickness T1 of each of the steel laminations 101 of the first core portion 10A in the stator core 10, and the sheet thickness T2 of each of the steel laminations 101 of the second core portion 10B satisfy the relationship of T0≥T2>T1. Thus, the magnetic flux is least likely to flow in the axial direction in the first core portion 10A, and the magnetic flux is most likely to flow in the axial direction in the region of the rotor core 50 on the outer circumferential side of the magnet insertion hole 51. Therefore, the flow of the magnetic flux in the axial direction in the stator core 10 can be reduced, and thus the eddy current loss can be reduced and the motor efficiency can be enhanced.

The lamination gap L1 of the steel laminations 101 of the stator core 10 and the lamination gap L0 of the steel laminations 501 of the rotor core 50 are the same (L0=L1) in this example. However, the lamination gaps L0 and L1 may satisfy L0<L1 as in the first embodiment. In this case, the difference (L1−L0) in the lamination gap is desirably within the range of 0.004 to 0.012 mm.

Alternatively, as in the second embodiment, the lamination gap L1 of the steel laminations 101 of the first core portion 10A, the lamination gap L2 of the steel laminations 101 of the second core portion 10B, and the lamination gap L0 of the steel laminations 501 of the rotor core 50 may satisfy the relationship of L0≤L2<L1.

Fifth Embodiment

Figure 18:
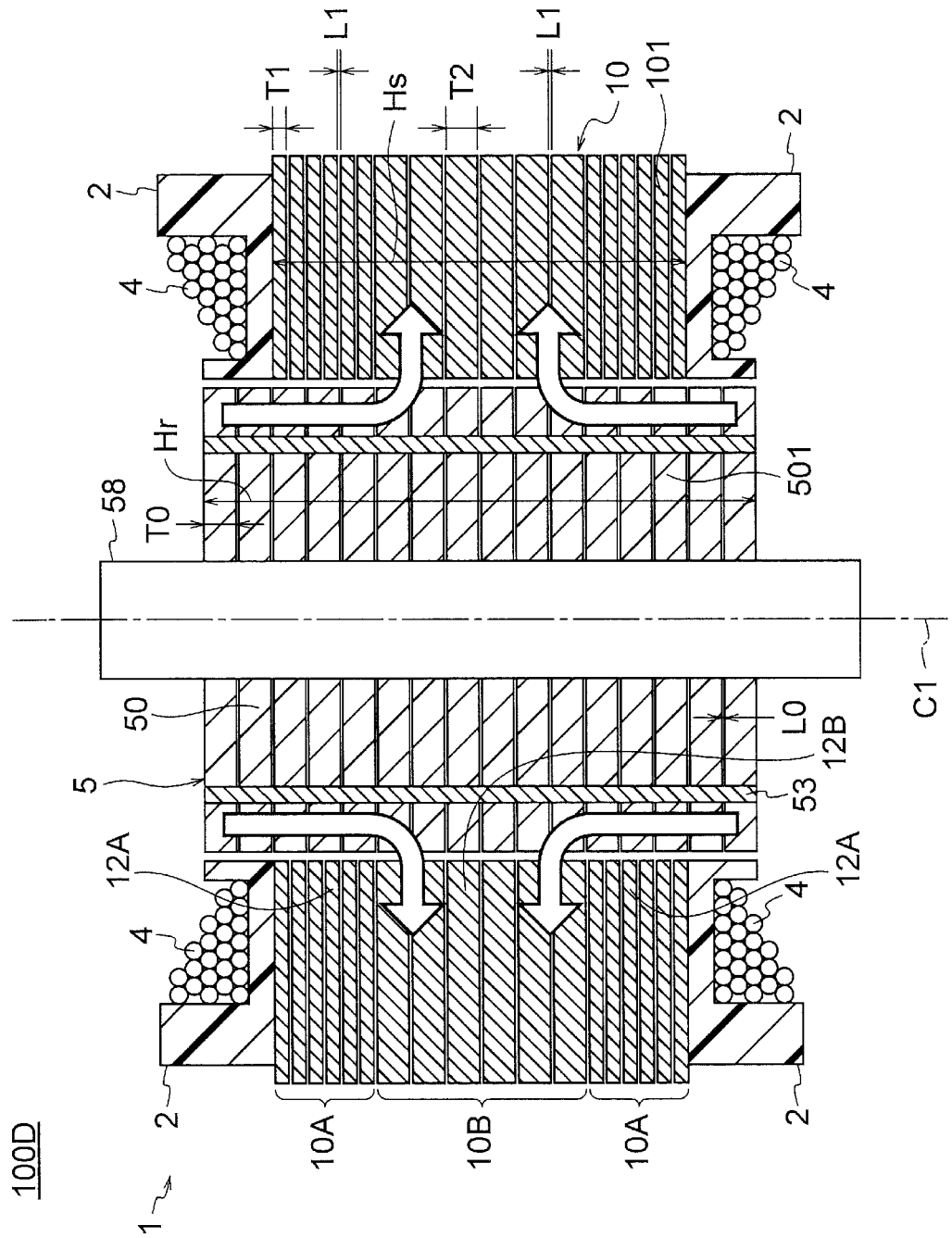
FIG. 18 is a longitudinal-sectional view showing a motor of a fifth embodiment.

FIG. 18 is a longitudinal-sectional view showing a motor 100D of a fifth embodiment. In the above-described first to fourth embodiments, the length of the rotor core 50 in the axial direction and the length of the stator core 10 in the axial direction are the same. In contrast, in the fifth embodiment, the length Hr of the rotor core 50 in the axial direction is longer than the length Hs of the stator core 10 in the axial direction.

As shown in FIG. 18, both ends of the rotor core 50 in the axial direction protrude from the stator core 10 in the axial direction. The length Hr of the rotor core 50 in the axial direction is, for example, 50 mm, while the length Hs of the stator core 10 in the axial direction is, for example, 45 mm.

Other structures of this embodiment are as described in the fourth embodiment. That is, the sheet thickness T0 of each of the steel laminations 501 of the rotor core 50, the sheet thickness T1 of each of the steel laminations 101 of the first core portion 10A, and the sheet thickness T2 of each of the steel laminations 101 of the second core portion 10B satisfy the relationship of T0≥T2>T1.

In the fifth embodiment, the length Hr of the rotor core 50 in the axial direction is longer than the length Hs of the stator core 10 in the axial direction. Thus, the magnetic flux of the permanent magnet 53 interlinking with the coil 4 can be increased without increasing the wire length of the coil 4. That is, the coil resistance can be reduced, and the motor efficiency can be further enhanced.

Since the length Hr of the rotor core 50 in the axial direction is longer than the length Hs of the stator core 10 in the axial direction, the magnetic flux density at both end portions (i.e., at the first core portions 10A) of the stator core 10 in the axial direction increases. This results in an increase in the magnetic flux flowing from the rotor core 50 to the first tooth portion 12A. Thus, the magnetic saturation in the first tooth portion 12A tends to cause the flow of magnetic flux in the axial direction, and the eddy current loss described above is especially likely to occur.

In the fifth embodiment, the occurrence of eddy current loss in the stator core 10 is suppressed due to the relationship of T0≥T2>T1 described above. This effect of suppressing the eddy current loss is especially effectively exhibited in the motor 10D in which the length Hr of the rotor core 50 in the axial direction is longer than the length Hs of the stator core 10 in the axial direction.

As described above, in the fifth embodiment, the length Hr of the rotor core 50 in the axial direction is longer than the length Hs of the stator core 10 in the axial direction. Thus, the effect of reducing the eddy current loss (i.e., the effect of enhancing the motor efficiency) due to the relationship of T0≥T2>T1 described above can be especially effectively exhibited.

In the fifth embodiment, a configuration in which the length Hr of the rotor core 50 in the axial direction is longer than the length Hs of the stator core 10 in the axial direction is employed in the motor described in the fourth embodiment described above. However, the configuration in which the length Hr of the rotor core 50 in the axial direction is longer than the length Hs of the stator core 10 in the axial direction may be employed in any of the motors described in the first to third embodiments.

Figure 19:
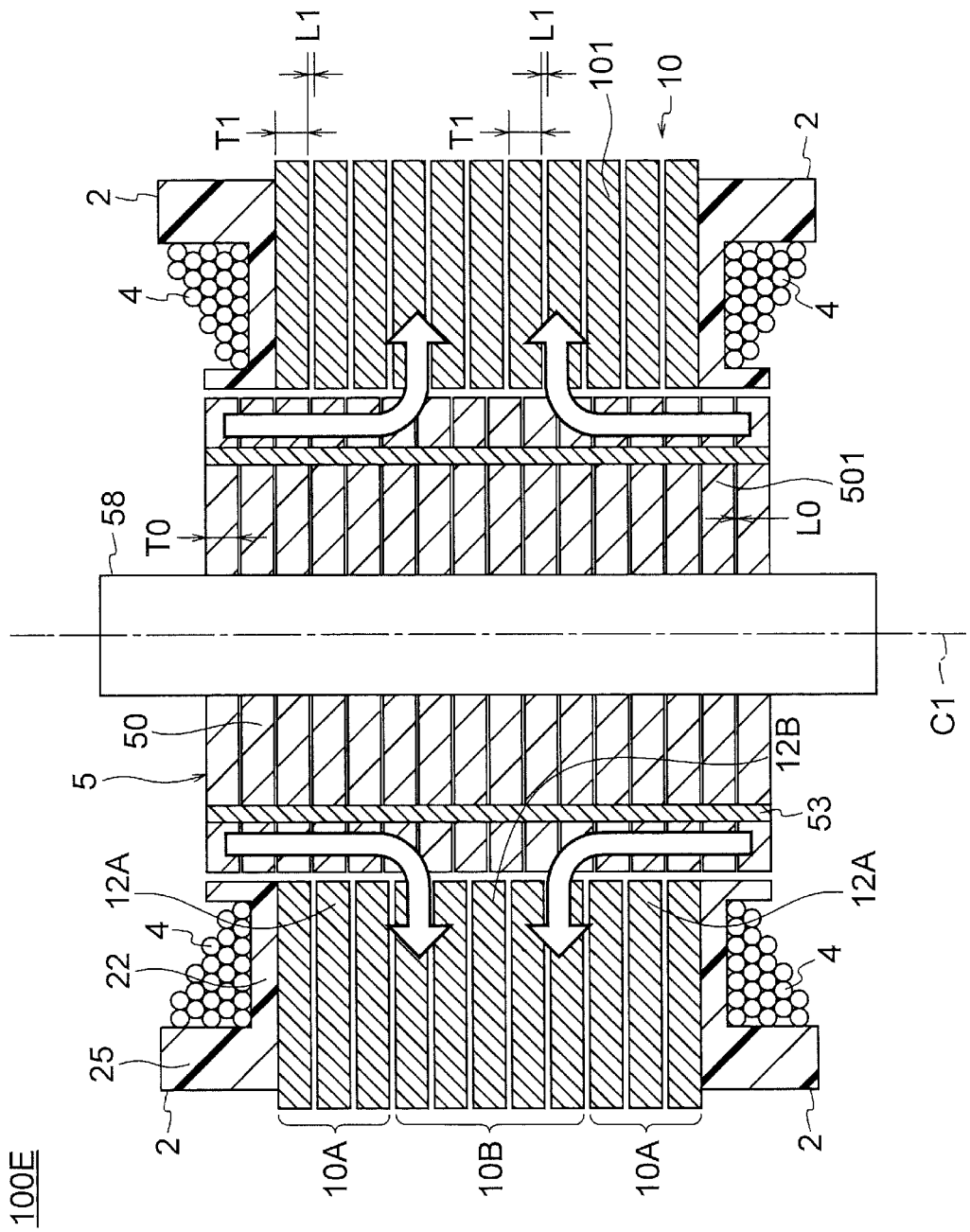
FIG. 19 is a longitudinal-sectional view showing another configuration example of the motor of the fifth embodiment.

FIG. 19 is a longitudinal-sectional view showing a motor 100E in which the configuration in which the length Hr of the rotor core 50 in the axial direction is longer than the length Hs of the stator core 10 in the axial direction is employed in the motor 100 (FIG. 8) described in the first embodiment. As shown in FIG. 19, both ends of the rotor core 50 in the axial direction protrude from the stator core 10 in the axial direction.

The stator core 10 and the rotor core 50 are configured in a similar manner to the first embodiment except that the stator core 10 and the rotor core 50 have different lengths in the axial direction. That is, the lamination gap L1 of the steel laminations 101 of the stator core 10 is wider than the lamination gap L0 of the steel laminations 501 of the rotor core 50 (L0<L1).

The occurrence of eddy current loss in the stator core 10 can be suppressed due to the relationship of L0<L1 described above. The effect of suppressing the eddy current loss is especially effectively exhibited in the motor 10E in which the length Hr of the rotor core 50 in the axial direction is longer than the length Hs of the stator core 10 in the axial direction.

Also, when the configuration in which the length Hr of the rotor core 50 in the axial direction is longer than the length Hs of the stator core 10 in the axial direction is employed in the motors described in the second and third embodiments, the effect of suppressing the eddy current loss can be especially efficiently exhibited.

(Rotary Compressor)

Next, the rotary compressor 300 to which the motor of each embodiment described above is applicable will be described. FIG. 20 is a cross-sectional view showing the rotary compressor 300. The rotary compressor 300 includes a frame 301, a compression mechanism 310 disposed in the frame 301, and the motor 100 that drives the compression mechanism 310.

The compression mechanism 310 includes a cylinder 311 having a cylinder chamber 312, a rolling piston 314 fixed to the shaft 58 of the motor 100, a vane (not shown) dividing the inside of the cylinder chamber 312 into a suction side and a compression side, and an upper frame 316 and a lower frame 317 which close end surfaces of the cylinder chamber 312 in the axial direction and into which the shaft 58 is inserted. An upper discharge muffler 318 and a lower discharge muffler 319 are mounted on the upper frame 316 and the lower frame 317, respectively.

The frame 301 is a cylindrical container that is formed by drawing a steel sheet having a thickness of, for example, 3 mm. Refrigerating machine oil (not shown) for lubricating sliding portions of the compression mechanism 310 is stored at the bottom of the frame 301. The shaft 58 is rotatably held by the upper frame 316 and the lower frame 317.

The cylinder 311 has the cylinder chamber 312 therein. The rolling piston 314 eccentrically rotates in the cylinder chamber 312. The shaft 58 has an eccentric shaft portion to which a rolling piston 314 is fitted.

The stator core 10 of the motor 100 is fitted to the inside of the frame 301 by shrink-fitting. The coil 4 wound on the stator core 10 is supplied with power from a glass terminal 305 fixed to the frame 301. The shaft 58 is fixed to a shaft hole 55 (FIG. 1) of the rotor 5.

An accumulator 302 that stores refrigerant gas is attached to an outer side of the frame 301. A suction pipe 303 is fixed to the frame 301, and the refrigerant gas is supplied from the accumulator 302 to the cylinder 311 via the suction pipe 303. A discharge pipe 307 through which the refrigerant is discharged to the outside is provided at an upper portion of the frame 301.

For example, R410A, R407C, R22 or the like can be used as the refrigerant. From the viewpoint of preventing global warming, a low GWP (global warming potential) refrigerant is desirably used. For example, the following refrigerant can be used as the low GWP refrigerant.

(1) First, a halogenated hydrocarbon having a carbon double bond in its composition, for example, HFO (Hydro-Fluoro-Orefin)-1234yf ($CF_3CF=CH_2$), can be used. The GWP of HFO-1234yf is 4.

(2) Further, a hydrocarbon having a carbon double bond in its composition, for example, R1270 (propylene), may be used. The GWP of R1270 is 3, which is lower than that of HFO-1234yf, but the flammability of R1270 is higher than that of HFO-1234yf.

(3) A mixture containing at least one of a halogenated hydrocarbon having a carbon double bond in its composition and a hydrocarbon having a carbon double bond in its composition, for example, a mixture of HFO-1234yf and R32, may also be used. HFO-1234yf described above is a low-pressure refrigerant and thereby tends to increase a pressure loss which may lead to reduction in the performance of a refrigeration cycle (particularly, evaporator). For this reason, a mixture of the HFO-1234yf with R32 or R41, which is higher pressure refrigerant than HFO-1234yf, is desirable in practice.

An operation of the rotary compressor 300 is as follows. Refrigerant gas supplied from the accumulator 302 is supplied to the cylinder chamber 312 of the cylinder 311 through the suction pipe 303. When the motor 100 is driven to rotate the rotor 5, the shaft 58 rotates together with the rotor 5. Then, the rolling piston 314 fitted to the shaft 58 eccentrically rotates in the cylinder chamber 312, thereby compressing the refrigerant in the cylinder chamber 312. The compressed refrigerant passes through the discharge mufflers 318 and 319, flows upward in the frame 301 through holes (not shown) provided in the motor 100, and is then discharged to the outside through the discharge pipe 307.

The motor described above in each embodiment has high motor efficiency by suppressing eddy current. Thus, by using the motor described in each embodiment as a drive source of the compressor 300, the operation efficiency of the compressor 300 can be enhanced.

(Air Conditioner)

Figure 21:
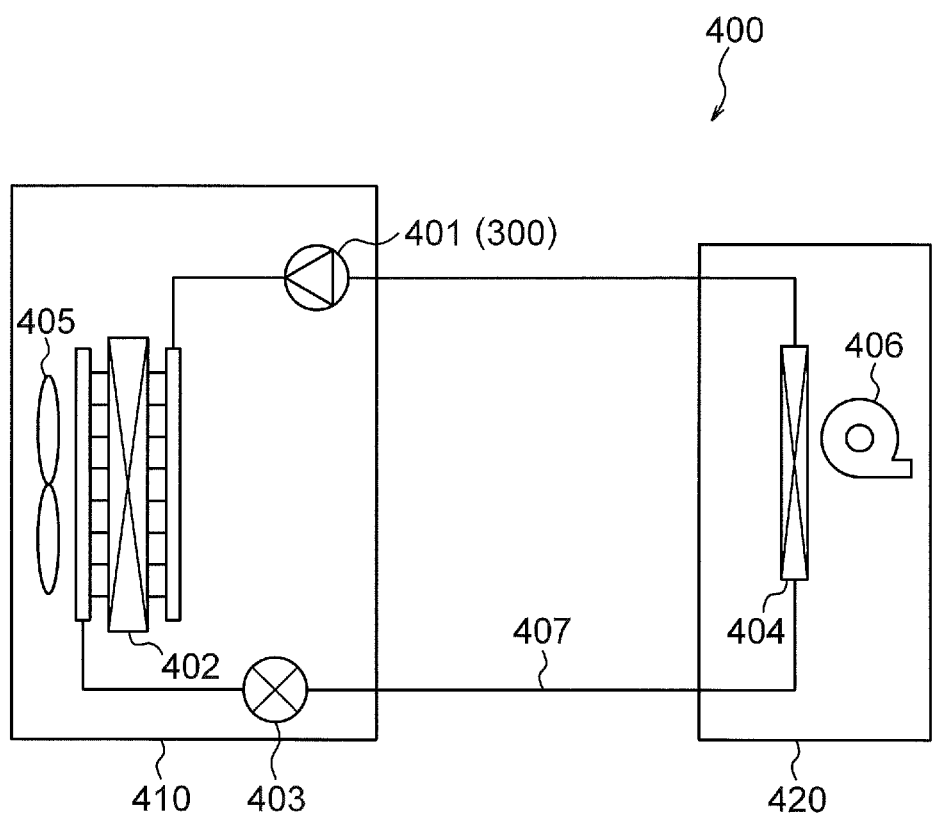
FIG. 21 is a diagram showing an air conditioner that includes the rotary compressor in FIG. 20.

Next, an air conditioner 400 including the compressor 300 shown in FIG. 20 will be described. FIG. 21 is a diagram showing the air conditioner 400. The air conditioner 400 shown in FIG. 21 includes a compressor 401, a condenser 402, a throttle device (a decompression device) 403, and an evaporator 404. The compressor 401, the condenser 402, the throttle device 403, and the evaporator 404 are connected by a refrigerant pipe 407 to constitute a refrigeration cycle. That is, the refrigerant circulates through the compressor 401, the condenser 402, the throttle device 403, and the evaporator 404 in this order.

The compressor 401, the condenser 402, and the throttle device 403 are provided in an outdoor unit 410. The compressor 401 is constituted by the rotary compressor 300 shown in FIG. 20. The outdoor unit 410 is provided with an outdoor fan 405 that supplies outdoor air to the condenser 402. The evaporator 404 is provided in an indoor unit 420. The indoor unit 420 is provided with an indoor fan 406 that supplies indoor air to the evaporator 404.

An operation of the air conditioner 400 is as follows. The compressor 401 compresses sucked refrigerant and sends out the compressed refrigerant. The condenser 402 exchanges heat between the refrigerant flowing in from the compressor 401 and the outdoor air to condense and liquefy the refrigerant, and sends out the liquefied refrigerant to the refrigerant pipe 407. The outdoor fan 405 supplies the outdoor air to the condenser 402. The throttle device 403 adjusts the pressure or the like of the refrigerant flowing through the refrigerant pipe 407 by changing its opening degree.

The evaporator 404 exchanges heat between the refrigerant brought into a low-pressure state by the throttle device 403 and the indoor air to cause the refrigerant to take heat from the air and evaporate (vaporize), and then sends out the evaporated refrigerant to the refrigerant pipe 407. The indoor fan 406 supplies the indoor air to the evaporator 404. Thus, cooled air from which the heat is taken in the evaporator 404 is supplied to the room.

The air conditioner 400 has the compressor 401 whose operation efficiency is enhanced by employing the motor described in each embodiment. Thus, the operation efficiency of the air conditioner 400 can be enhanced.

Although the desirable embodiments of the present invention have been specifically described above, the present invention is not limited to the above-described embodiments, and various modifications or changes can be made to those embodiments without departing from the scope of the present invention.

What is claimed is:

1. A motor comprising:
 a rotor rotatable about a rotation axis, the rotor having a rotor core having steel laminations stacked in an axial direction of the rotation axis and a permanent magnet embedded in the rotor core; and
 a stator provided so as to surround the rotor, the stator having a stator core having steel laminations stacked in the axial direction and a coil wound on the stator core,
 wherein the stator core has a slot in which the coil is housed,
 wherein the stator core has a first core portion at an end portion of the stator core in the axial direction and a second core portion at a center portion of the stator core in the axial direction, an area of the slot being larger in the first core portion than in the second core portion, and
 wherein a sheet thickness $T0$ and a lamination gap $L0$ of the steel laminations of the rotor core and a sheet thickness $T1$ and a lamination gap $L1$ of the steel laminations of the first core portion of the stator core satisfy at least one of:

$$0.05\ \text{mm} \leq T0 - T1 \leq 0.15\ \text{mm and}\ L0 < L1.$$

2. The motor according to claim 1, wherein the stator core has a yoke extending in a circumferential direction about the rotation axis and a tooth extending from the yoke toward the rotation axis, and
 wherein a width of the tooth in the first core portion of the stator core in the circumferential direction is narrower than a width of the tooth in the second core portion of the stator core in the circumferential direction.

3. The motor according to claim 1, wherein a crimping depth of the steel laminations of the first core portion of the stator core is greater than a crimping depth of the steel laminations of the rotor core.

4. The motor according to claim 1, wherein the lamination gap $L0$ of the steel laminations of the rotor core, the lamination gap $L1$ of the steel laminations of the first core portion of the stator core, and a lamination gap $L2$ of steel laminations of the second core portion of the stator core satisfy:

$$L0 \leq L2 < L1.$$

5. The motor according to claim 1, wherein a difference $L1-L0$ between the lamination gap $L1$ and the lamination gap $L0$ satisfies:

$$0.004\ \text{mm} \leq L1 - L0 < 0.012\ \text{mm}.$$

6. The motor according to claim 1, wherein the sheet thickness $T0$ of the steel laminations of the rotor core, the sheet thickness $T1$ of the steel laminations of the first core portion of the stator core, and a sheet thickness $T2$ of the steel laminations of the second core portion of the stator core satisfy:

$$T0 \geq T2 > T1.$$

7. The motor according to claim 1, wherein a length of the rotor core in the axial direction is longer than a length of the stator core in the axial direction.

8. The motor according to claim 1, wherein the permanent magnet is a rare earth magnet.

9. The motor according to claim 1, wherein the rotor core has a magnet insertion hole into which the permanent magnet is inserted, and
 wherein the magnet insertion hole is formed in a V shape such that a center portion of the magnetic insertion hole in a circumferential direction about the rotation axis protrudes toward the rotation axis.

10. The motor according to claim 1, further comprising an insulator disposed between the stator core and the coil,
 wherein the insulator is engaged with a step portion formed between the first core portion and the second core portion of the stator core.

11. The motor according to claim 10, wherein the insulator is disposed in the first core portion of the stator core, and
 wherein an insulating film is disposed on an inner surface of the slot of the stator core.

12. A compressor comprising:
 the motor according to claim 1, and
 a compression mechanism driven by the motor.

13. An air conditioner comprising a compressor, a condenser, a decompression device and an evaporator,
 the compressor comprising:
 the motor according to claim 1, and
 a compression mechanism driven by the motor.

* * * * *